US012064794B2

(12) United States Patent
Qiao et al.

(10) Patent No.: US 12,064,794 B2
(45) Date of Patent: Aug. 20, 2024

(54) HANDHELD HIGH-PRESSURE CLEANING MACHINE

(71) Applicant: Positec Power Tools (Suzhou) Co., Ltd, Jiangsu (CN)

(72) Inventors: Yong Qiao, Jiangsu (CN); Qibin Wang, Jiangsu (CN); Haohua Dong, Jiangsu (CN)

(73) Assignee: Positec Power Tools (Suzhou) Co., Ltd., Suzhou (CN)

(*) Notice: Subject to any disclaimer, the term of this patent is extended or adjusted under 35 U.S.C. 154(b) by 809 days.

(21) Appl. No.: 17/145,165

(22) Filed: Jan. 8, 2021

(65) Prior Publication Data

US 2021/0129190 A1 May 6, 2021

Related U.S. Application Data

(63) Continuation of application No. PCT/CN2019/095225, filed on Jul. 9, 2019.

(30) Foreign Application Priority Data

Jul. 9, 2018 (CN) ......................... 201810742000.7
Jul. 9, 2018 (CN) ......................... 201810743756.3
(Continued)

(51) Int. Cl.
*B08B 3/02* (2006.01)
*B05B 9/01* (2006.01)
(Continued)

(52) U.S. Cl.
CPC ................ *B08B 3/026* (2013.01); *B05B 9/01* (2013.01); *B05B 9/0413* (2013.01); *B08B 13/00* (2013.01);
(Continued)

(58) Field of Classification Search
CPC . B08B 3/026; B08B 13/00; B08B 2203/0223; B08B 2203/027; B08B 3/028;
(Continued)

(56) References Cited

U.S. PATENT DOCUMENTS 11,426,746 B2 * 8/2022 Sugiura ................ B05B 9/0426
2013/0333263 A1 12/2013 Hovey
(Continued)

FOREIGN PATENT DOCUMENTS

CN 201807486 U 4/2011
CN 103956441 A 7/2014
(Continued)

OTHER PUBLICATIONS

The Chinese Office Action mailed May 1, 2024, for related Chinese patent application No. 201910247328.6, 9 pages.
(Continued)

*Primary Examiner* — Qingzhang Zhou
(74) *Attorney, Agent, or Firm* — Lee & Hayes, P.C.

(57) ABSTRACT

The present invention relates to a handheld high-pressure cleaning machine, including: a main machine housing, allowing detachable attachment of a battery pack, where the main machine housing includes a main body portion; a liquid outlet; a first handle; a motor; and a pump, where a battery pack mounting portion includes a first battery pack mounting portion and a second battery pack mounting portion, and the battery pack includes a first battery pack and a second battery pack; and the first battery pack mounting portion and the second battery pack mounting portion are respectively disposed on left and right sides of a middle plane in a manner that a distance W2 between a leftmost edge of the first battery pack mounting portion and a rightmost edge of the second battery pack mounting portion is not greater than a width W1 of the main body portion.

17 Claims, 27 Drawing Sheets

(30) Foreign Application Priority Data

| | | |
|---|---|---|
| Jul. 9, 2018 | (CN) | 201810747334.3 |
| Mar. 29, 2019 | (CN) | 201910247328.6 |
| Apr. 9, 2019 | (CN) | 201910279910.0 |

(51) Int. Cl.
*B05B 9/04* (2006.01)
*B08B 13/00* (2006.01)
*F04B 17/03* (2006.01)
*F04B 53/16* (2006.01)

(52) U.S. Cl.
CPC .............. *F04B 17/03* (2013.01); *F04B 53/16* (2013.01); *B08B 2203/0223* (2013.01); *B08B 2203/027* (2013.01)

(58) Field of Classification Search
CPC ......... B05B 9/01; B05B 9/0413; B05B 12/00; B05B 15/63; B05B 9/0426; B05B 15/65; F04B 17/03; F04B 53/16
See application file for complete search history.

(56) References Cited

U.S. PATENT DOCUMENTS

| | | | | |
|---|---|---|---|---|
| 2015/0251223 | A1 | 9/2015 | Horie et al. | |
| 2016/0236217 | A1* | 8/2016 | Jenkins | A47L 11/4005 |
| 2019/0283061 | A1 | 9/2019 | Qiao | |

FOREIGN PATENT DOCUMENTS

| | | | |
|---|---|---|---|
| CN | 205495890 | U | 8/2016 |
| CN | 205570600 | U | 9/2016 |
| CN | 107486426 | A | 12/2017 |
| CN | 108144899 | A | 6/2018 |
| CN | 108160366 | A | 6/2018 |
| CN | 108212585 | A | 6/2018 |
| CN | 207479075 | U | 6/2018 |
| CN | 207641912 | U | 7/2018 |
| CN | 207839213 | U | 9/2018 |
| CN | 208018814 | U | 10/2018 |
| CN | 208177712 | U | 12/2018 |
| CN | 208230165 | U | 12/2018 |
| CN | 210815840 | U | 6/2020 |
| DE | 102008059589 | A1 | 6/2010 |
| DE | 202012001341 | U1 | 2/2013 |
| DE | 202016106018 | U1 | 12/2016 |
| EP | 0940864 | A2 | 9/1999 |
| EP | 2191905 | B1 | 6/2012 |
| EP | 2534744 | A1 | 12/2012 |
| EP | 3552721 | A1 | 10/2019 |
| GB | 2060784 | A | 5/1981 |
| JP | 2003-142051 | A | 5/2003 |
| JP | 2011204697 | A | 10/2011 |
| JP | 2885113 | A2 | 6/2015 |
| JP | 2020-513307 | A | 5/2020 |
| WO | 2011082830 | A1 | 7/2011 |
| WO | 2011099348 | A1 | 8/2011 |
| WO | 2012/025425 | A1 | 3/2012 |
| WO | WO2014142877 | A1 | 9/2014 |
| WO | 2017143497 | A1 | 8/2017 |
| WO | 2018103669 | A1 | 6/2018 |

OTHER PUBLICATIONS

CN Search Report dated May 1, 2024, for related CN Application No. CN201910247328.6, 2 Pages.

* cited by examiner

HANDHELD HIGH-PRESSURE CLEANING MACHINE

CROSS-REFERENCE TO RELATED APPLICATIONS

This application is a Continuation of International Application No. PCT/CN2019/095225, filed on Jul. 9, 2019, which claims the benefit of and priority to Chinese Patent Application No. 201810743756.3, entitled "HANDHELD HIGH-PRESSURE CLEANING MACHINE" and filed on Jul. 9, 2018; Chinese Patent Application No. 201910247328.6, entitled "HANDHELD HIGH-PRESSURE CLEANING MACHINE" and filed on Mar. 29, 2019; Chinese Patent Application No. 201810742000.7, entitled "HANDHELD HIGH-PRESSURE CLEANING MACHINE" and filed on Jul. 9, 2018; Chinese Patent Application No. 201910279910.0, entitled "HANDHELD HIGH-PRESSURE CLEANING MACHINE" and filed on Apr. 9, 2019; and Chinese Patent Application No. 201810747334.3, entitled "HANDHELD HIGH-PRESSURE CLEANING MACHINE AND CLEANING DEVICE" and filed on Jul. 9, 2018, all content thereof is incorporated herein by reference in their entireties.

BACKGROUND

Technical Field

Embodiments of the present disclosure relate to a handheld high-pressure cleaning machine, and in particular, to the position of a battery pack mounting portion of a handheld high-pressure cleaning machine.

Related Art

A cleaning device is configured to clean stains such as muds, oil stains, leaves, and dust on the surface of an object by using water pressure. There are a variety of cleaning devices. One common cleaning device is a seat-type cleaning machine. However, the seat-type cleaning machine is poorly portable and can only be used in very limited scenarios and places. A user cannot perform cleaning anytime and anywhere.

To meet requirements that the user can perform cleaning conveniently and carry the cleaning machine easily at home or outdoors, currently, a handheld high-pressure cleaning machine powered by a direct current battery pack is commercially available. However, the high-pressure cleaning machine configured with a single battery pack has some problems. On one hand, the capacity of the battery pack is insufficient. On the other hand, other functional components matching the single battery pack cannot provide relatively high water flow and water outlet pressure. As a result, the cleaning performance of the cleaning machine cannot meet the requirements of the user.

Therefore, it is necessary to provide a novel handheld high-pressure cleaning machine, to resolve the foregoing problems.

SUMMARY

To overcome disadvantages in the prior art, a problem to be resolved by embodiments of the present disclosure is to provide a handheld high-pressure cleaning machine with high power supply.

A technical solution used by the embodiments of the present disclosure to resolve the problem of the prior art is to provide a handheld high-pressure cleaning machine, including: a main machine housing, mounted or integrally formed with a battery pack mounting portion, where the battery pack mounting portion is configured to allow detachable attachment of a battery pack; a liquid outlet, disposed at a free end of the main machine housing; a first handle, to be held by an operator, where the first handle is mounted or integrally formed on the main machine housing and is disposed at an end away from the liquid outlet; a motor, disposed in the main machine housing, where the battery pack is capable of supplying power to the motor, to supply a driving force for the handheld high-pressure cleaning machine to operate; and a pump, driven by the motor to output a cleaning liquid, where the battery pack mounting portion includes a first battery pack mounting portion and a second battery pack mounting portion, and the battery pack includes a first battery pack connected to the first battery pack mounting portion and a second battery pack connected to the second battery pack mounting portion; the center of gravity G of the handheld high-pressure cleaning machine is located between the first handle and the liquid outlet, so that the first battery pack and the second battery pack are configured between the liquid outlet and the first handle in a manner that a ratio Q of a distance D between the center of the first handle and the center of gravity G of the handheld high-pressure cleaning machine to a distance H between the center of gravity G of the handheld high-pressure cleaning machine and the liquid outlet in the longitudinal direction is less than 1.

In an implementation, the ratio Q is greater than or equal to 30% and less than or equal to 80%.

In an implementation, the main machine housing includes a main body portion, the motor and the pump are both located in the main body portion, the main body portion and the first handle cooperate with each other to form a mounting space, and the two battery pack mounting portions are both located in the mounting space.

In an implementation, the main machine housing further includes a liquid outlet pipe, the liquid outlet pipe is disposed on a side of the main body portion that is away from the first handle, and the liquid outlet is disposed at a free end of the liquid outlet pipe.

In an implementation, the handheld high-pressure cleaning machine includes a liquid inlet joint provided with a liquid inlet, the liquid inlet is in communication with the pump, and the first battery pack and the second battery pack are disposed between the liquid inlet joint and the first handle and located below the main body portion.

In an implementation, the first handle is closer to the two battery pack mounting portions than the liquid outlet.

In an implementation, the motor, the first battery pack, and the second battery pack form an energy component, and in the longitudinal direction, and the energy component is placed on a relatively rear side of the handheld high-pressure cleaning machine.

In view of this, one of the objectives of the embodiments of the present disclosure is to provide a handheld high-pressure cleaning machine with high power supply.

To achieve the foregoing objective, a technical solution used by the embodiments of the present disclosure is to provide a handheld high-pressure cleaning machine, including: a main machine housing, mounted or integrally formed with a battery pack mounting portion, where the battery pack mounting portion is configured to allow detachable attachment of a battery pack; a liquid outlet, provided in the main machine housing; a first handle, to be held by an operator, where the first handle is mounted or integrally formed on the main machine housing and is disposed at an end away from the liquid outlet; a motor, disposed in the main machine housing, where the battery pack is capable of supplying power to the motor, to supply a driving force for the handheld high-pressure cleaning machine to operate; and a pump, driven by the motor to output a cleaning liquid, where the battery pack mounting portion includes a first battery pack mounting portion and a second battery pack mounting portion, the battery pack includes a first battery pack connected to the first battery pack mounting portion and a second battery pack connected to the second battery pack mounting portion, and the first battery pack mounting portion and the second battery pack mounting portion are configured in a manner that the first battery pack and the second battery pack can be respectively disposed on left and right sides of the main machine housing.

In an implementation, the main machine housing includes a main body portion, the motor and the pump are both located in the main body portion, the main body portion is provided with a middle plane, and the main body portion is disposed approximately symmetrically about the middle plane.

In an implementation, the first battery pack mounting portion and the second battery pack mounting portion are symmetrical about the middle plane.

In an implementation, the two battery pack mounting portions are disposed in parallel on left and right sides of the middle plane in a manner that a distance W2 between a leftmost edge of the first battery pack mounting portion and a rightmost edge of the second battery pack mounting portion in the transverse direction is not greater than a width W1 of the main body portion in the transverse direction.

In an implementation, the first battery pack and the second battery pack are slidably attached to corresponding battery pack mounting portions respectively, and directions of slidable attachment of the first battery pack and the second battery pack are the same.

In an implementation, each of the first battery pack mounting portion and the second battery pack mounting portion is provided with an opening for slidable attachment of a corresponding battery pack, and the opening is provided facing downward.

To overcome disadvantages in the prior art, a problem to be resolved by embodiments of the present disclosure is to provide a handheld high-pressure cleaning machine with high power supply.

A technical solution used by the embodiments of the present disclosure to resolve the problem of the prior art is to provide a handheld high-pressure cleaning machine, including: a main machine housing, mounted or integrally formed with a battery pack mounting portion, where the battery pack mounting portion is configured to allow detachable attachment of a battery pack; a liquid outlet, provided in the main machine housing; a first handle, to be held by an operator, where the first handle is mounted or integrally formed on the main machine housing and is disposed at an end away from the liquid outlet; a motor, disposed in the main machine housing, where the battery pack is capable of supplying power to the motor, to supply a driving force for the handheld high-pressure cleaning machine to operate; and a pump, driven by the motor to output a cleaning liquid, where the battery pack mounting portion includes a first battery pack mounting portion and a second battery pack mounting portion, and the battery pack includes a first battery pack connected to the first battery pack mounting portion and a second battery pack connected to the second battery pack mounting portion;

the handheld high-pressure cleaning machine further includes a second handle, and the second handle cooperates with the first handle to implement two-hand operation of the handheld high-pressure cleaning machine; and the center of gravity G of the handheld high-pressure cleaning machine is located between the first handle and the second handle, so that the first battery pack and the second battery pack are configured between the first handle and the second handle in a manner that a ratio K of a distance D between the center of gravity G of the handheld high-pressure cleaning machine and the center of the first handle to a straight-line distance L between the center of the first handle and the center of the second handle is within a range of greater than or equal to 35% and less than 50% in the longitudinal direction.

In an implementation, the first battery pack and the second battery pack are configured between the first handle and the second handle in a manner that the ratio K of the distance D between the center of gravity G of the handheld high-pressure cleaning machine and the center of the first handle to the straight-line distance L between the center of the first handle and the center of the second handle is within a range of greater than or equal to 35% and less than or equal to 45% in the longitudinal direction.

In an implementation, the second handle is disposed closer to the liquid outlet than the first handle.

In an implementation, the first battery pack is inserted into the first battery pack mounting portion in a manner that the center of gravity G1 of the first battery pack is located between the center of gravity G of the handheld high-pressure cleaning machine and the center of the first handle in the longitudinal direction.

In an implementation, the second battery pack is inserted in the second battery pack mounting portion in a manner that the center of gravity G2 of the second battery pack is located between the center of gravity G of the handheld high-pressure cleaning machine and the center of the first handle in the longitudinal direction.

To overcome disadvantages in the prior art, a problem to be resolved by embodiments of the present disclosure is to provide a handheld high-pressure cleaning machine with high power supply.

A technical solution used by the embodiments of the present disclosure to resolve the problem of the prior art is to provide a handheld high-pressure cleaning machine, including: a main machine housing, mounted or integrally formed with a battery pack mounting portion, where the battery pack mounting portion is configured to allow detachable attachment of a battery pack; a liquid outlet, provided in the main machine housing; a first handle, to be held by an operator, where the first handle is mounted or integrally formed on the main machine housing and is disposed at an end away from the liquid outlet; a motor, disposed in the main machine housing, where the battery pack is capable of supplying power to the motor, to supply a driving force for the handheld high-pressure cleaning machine to operate; and a pump, driven by the motor to output a cleaning liquid, where the battery pack mounting portion includes a first battery pack mounting portion and a second battery pack mounting portion, and the battery pack includes a first battery pack connected to the first battery pack mounting portion and a second battery pack connected to the second battery pack mounting portion; and the positions of the first battery pack mounting portion and the second battery pack mounting portion are configured to enable lower surfaces of the two battery packs to be located in the same plane when the two battery packs are mounted on corresponding battery pack mounting portions.

To overcome disadvantages in the prior art, a problem to be resolved by embodiments of the present disclosure is to provide a handheld high-pressure cleaning machine with high power supply.

In an implementation, the main machine housing includes a main body portion, the motor and the pump are both located in the main body portion, the main body portion is provided with a middle plane, the main body portion is disposed approximately symmetrically about the middle plane, and the first battery pack mounting portion and the second battery pack mounting portion both extend across the middle plane in the transverse direction.

In an implementation, the first battery pack mounting portion and the second battery pack mounting portion are arranged in a row in the longitudinal direction, to enable one of the first battery pack mounting portion and the second battery pack mounting portion to be constructed to be closer to the liquid outlet than the other.

To overcome disadvantages in the prior art, a problem to be resolved by embodiments of the present disclosure is to provide a handheld high-pressure cleaning machine with high power supply.

A technical solution used by the embodiments of the present disclosure to resolve the problem of the prior art is to provide a handheld high-pressure cleaning machine, including: a main machine housing, mounted or integrally formed with a battery pack mounting portion, where the battery pack mounting portion is configured to allow detachable attachment of a battery pack; a liquid outlet, provided in the main machine housing; a first handle, to be held by an operator, where the first handle is mounted or integrally formed on the main machine housing and is disposed at an end away from the liquid outlet; a motor, disposed in the main machine housing, where the battery pack is capable of supplying power to the motor, to supply a driving force for the handheld high-pressure cleaning machine to operate; and a pump, driven by the motor to output a cleaning liquid, where the battery pack mounting portion includes a first battery pack mounting portion and a second battery pack mounting portion, and the battery pack includes a first battery pack connected to the first battery pack mounting portion and a second battery pack connected to the second battery pack mounting portion; and the first battery pack mounting portion and the second battery pack mounting portion are constructed in a manner that a ratio C of a distance A between the combined center of gravity G0 of the first battery pack and the second battery pack and the center of the first handle to a distance B between the combined center of gravity G0 and the liquid outlet is less than 1.

To overcome disadvantages in the prior art, a problem to be resolved by embodiments of the present disclosure is to provide a handheld high-pressure cleaning machine with high power supply.

A technical solution used by the embodiments of the present disclosure to resolve the problem of the prior art is to provide a handheld high-pressure cleaning machine, including: a main machine housing, mounted or integrally formed with a battery pack mounting portion, where the battery pack mounting portion is configured to allow detachable attachment of a battery pack; a liquid outlet, provided in the main machine housing; a first handle, to be held by an operator, where the first handle is mounted or integrally formed on the main machine housing and is disposed at an end away from the liquid outlet; a motor, disposed in the main machine housing, where the battery pack is capable of supplying power to the motor, to supply a driving force for the handheld high-pressure cleaning machine to operate; and a pump, driven by the motor to output a cleaning liquid, where the battery pack mounting portion includes a first battery pack mounting portion and a second battery pack mounting portion, and the first battery pack mounting portion is constructed to be closer to the liquid outlet than the second battery pack mounting portion.

To overcome disadvantages in the prior art, a problem to be resolved by embodiments of the present disclosure is to provide a handheld high-pressure cleaning machine with high power supply.

A technical solution used by the embodiments of the present disclosure to resolve the problem of the prior art is to provide a handheld high-pressure cleaning machine, including: a main machine housing, mounted or integrally formed with a battery pack mounting portion, where the battery pack mounting portion is configured to allow detachable attachment of a battery pack; a liquid outlet pipe, disposed on the main machine housing; a first handle, to be held by an operator, where the first handle is mounted or integrally formed on the main machine housing and is disposed at an end away from the liquid outlet; a motor, disposed in the main machine housing, where the battery pack is capable of supplying power to the motor, to supply a driving force for the handheld high-pressure cleaning machine to operate; and a pump, driven by the motor to output a cleaning liquid, where the battery pack mounting portion includes a first battery pack mounting portion and a second battery pack mounting portion, and the battery pack includes a first battery pack and a second battery pack respectively connected to the first battery pack mounting portion and the second battery pack mounting portion; and the handheld high-pressure cleaning machine is supported on a support plane by the liquid outlet piped, the first and the second battery packs; a part, in contact with the support plane, of the liquid outlet pipe is defined as a first support point; a part, in contact with the support plane, of the first battery pack is defined as a second support point;

a part, in contact with the support plane, of the second battery pack is defined as a third support point, the first support point, the second support point, and the third support point are connected end to end to form a triangle, and in the transverse direction, a projection G' of the center of gravity G of the handheld high-pressure cleaning machine on a triangular plane Z is located on a perpendicular line of the triangle, or the two battery packs are mounted on corresponding battery pack mounting portions in a manner that a size range in which the projection G' deviates leftward or rightward from the perpendicular line of the triangle is not greater than a half of the size of a line segment formed by connecting the second support point and the third support point.

In one of the implementations, the projection G' of the center of gravity G of the handheld high-pressure cleaning machine on the triangular plane Z is located in a region formed by the triangle.

In an implementation, the triangular plane Z includes a perpendicular line drawn through the first support point U to an opposite side of the first support point U, and the projection G' of the center of gravity G of the handheld high-pressure cleaning machine on the triangular plane Z is located on the perpendicular line, or the first battery pack and the second battery pack are mounted on corresponding battery pack mounting portions in a manner that a ratio of a size that the projection G' deviates leftward or rightward from the perpendicular line to the size of a line segment formed by connecting the second support point and the third support point is 0.55 to 0.9.

To overcome disadvantages in the prior art, a problem to be resolved by embodiments of the present disclosure is to provide a handheld high-pressure cleaning machine, including: a main machine housing, including a first handle for holding, a main body portion that is disposed at an angle from the first handle, a liquid inlet joint for a liquid to enter, and a liquid outlet portion for a liquid to be sprayed outward; a battery pack mounting portion, mounted or integrally formed on the main machine housing, where the battery pack mounting portion is configured to allow detachable connection of a battery pack; and functional components, including a motor disposed in the main body portion and a pump driven by the motor to transport a liquid outward, where the battery pack mounting portion includes a first battery pack mounting portion and a second battery pack mounting portion, the first battery pack mounting portion and the second battery pack mounting portion are respectively configured on left and right sides of the main machine housing, and a maximum distance w2 between outermost edges of the first battery pack mounting portion and the second battery pack mounting portion in the transverse direction is not greater than a maximum width w1 of the main body portion in the transverse direction.

In an implementation, each of the first battery pack mounting portion and the second battery pack mounting portion is provided with an opening for slidable attachment of a corresponding battery pack, and the opening is provided facing downward.

In an implementation, each of the first battery pack mounting portion and the second battery pack mounting portion is provided with two parallel mounting guide rails, and the corresponding battery packs are slidably attached from bottom to top to the first battery pack mounting portion and the second battery pack mounting portion along the mounting guide rails in an extending direction of the mounting guide rail.

In an implementation, the first handle includes a holding portion, and an extending direction of each mounting guide rail is approximately parallel to an extending direction of the holding portion.

In an implementation, the main body portion is provided with a middle plane, the main body portion is disposed approximately symmetrically about the middle plane, and the first battery pack mounting portion and the second battery pack mounting portion are symmetrical about the middle plane.

In a preferred implementation, the center of gravity of the handheld high-pressure cleaning machine is within a range of 1 to 1.5 times the width of the holding portion of the handle on the left or right side of the middle plane.

In an implementation, the battery pack includes a first battery pack adapted to be connected to the first battery pack mounting portion and a second battery pack adapted to be connected to the second battery pack mounting portion, where the first battery pack and the second battery pack are specifically a group of battery packs with the same specifications, and the group of battery packs is capable of being used together to supply power to the motor.

In an implementation, when the first battery pack and the second battery pack are mounted on the first battery pack mounting portion and the second battery pack mounting portion respectively, the handheld high-pressure cleaning machine is capable of being stably supported on a horizontal plane by using lower ends of the first battery pack and the second battery pack and the liquid outlet portion as support points.

In an implementation, when the first battery pack and the second battery pack are mounted on the first battery pack mounting portion and the second battery pack mounting portion respectively, a range of a width by which the handheld high-pressure cleaning machine increases in the left direction or right direction is 17 mm to 47 mm.

In an implementation, when the first battery pack and the second battery pack are mounted on the first battery pack mounting portion and the second battery pack mounting portion respectively, a range of a ratio of a maximum width w3 of the first battery pack and the second battery pack in the transverse direction to a maximum width w1 of the main body portion in the transverse direction is 1.2 to 2.

In an implementation, the main body portion and the first handle cooperate with each other to form a mounting space, and the first battery pack mounting portion and the second battery pack mounting portion are both located in the mounting space.

In a preferred implementation, the first battery pack mounting portion and the second battery pack mounting portion are located between the first handle and the liquid inlet joint in the longitudinal direction.

In a preferred embodiment, the first battery pack mounting portion is provided with a first accommodation portion, and the second battery pack mounting portion includes a second accommodation portion, where the first accommodation portion and the second accommodation portion are joined to form a sole portion, and the sole portion includes a hollow mounting cavity configured to mount a control component.

The present invention further provides a handheld high-pressure cleaning machine, including: a main machine housing, including a handle for holding, a main body portion that is disposed at an angle from the first handle, a liquid inlet joint for a liquid to enter, and a liquid outlet portion for a liquid to be sprayed outward; a battery pack mounting portion, mounted or integrally formed on the main machine housing; a battery pack, configured to be detachably connected to the battery pack mounting portion; and functional components, including a motor disposed in the main body portion and a pump driven by the motor to transport a liquid outward, where the battery pack mounting portion includes a first battery pack mounting portion and a second battery pack mounting portion, and the battery pack includes a first battery pack adapted to be connected to the first battery pack mounting portion and a second battery pack adapted to be connected to the second battery pack mounting portion; the first battery pack mounting portion and the second battery pack mounting portion are respectively configured on left and right sides of the main machine housing; and a maximum distance w2 between outermost edges of the first battery pack mounting portion and the second battery pack mounting portion in the transverse direction is not greater than a maximum width w1 of the main body portion in the transverse direction.

The present invention further provides a handheld high-pressure cleaning machine, including: a main machine housing and a pump disposed in the main machine housing; and a motor, disposed in the main machine housing, and configured to drive the pump to work. The handheld high-pressure cleaning machine further includes: a liquid outlet, provided in the main machine housing; a first handle, disposed on the main machine housing at a position away from the liquid outlet; and a second handle, disposed on the main machine housing at a position close to the liquid outlet.

In an implementation, the main machine housing includes a liquid outlet pipe, where the liquid outlet is disposed at a free end of the liquid outlet pipe; and the second handle is sleeved outside the liquid outlet pipe and is disposed coaxially with the liquid outlet pipe.

In an implementation, the main machine housing includes a liquid outlet pipe, where the liquid outlet is disposed at a free end of the liquid outlet pipe; and the second handle is connected to the outside of the liquid outlet pipe, and the second handle and the liquid outlet pipe are disposed at an angle, where a value range of the angle $\alpha$ is $0° < \alpha < 180°$; and a preferred angle is: $\alpha = 90°$.

In an implementation, the position of the second handle may be adjusted in an axial direction of the liquid outlet pipe.

In an implementation, the center of gravity of the handheld high-pressure cleaning machine is located between the first handle and the second handle.

In an implementation, a value range of a distance L between the center of the first handle and the center of the second handle is 200 mm≤L≤400 mm, where a preferred value of L is 200 mm, 220 mm, 240 mm, 260 mm, 280 mm, 300 mm, 320 mm, 340 mm, 360 mm, 380 mm or 400 mm.

In an implementation, holding regions of the first handle and/or the second handle have lengths not less than 100 mm.

In an implementation, the holding regions of the first handle and/or the second handle are provided with rubber coating, where a preferred material of rubber coating is TPE.

In an implementation, the holding regions of the first handle and/or the second handle are provided with skidproof stripes.

In an implementation, the first handle is disposed in a gun barrel form or a cross rod form relative to the main body portion.

Compared with the prior art, the present invention at least has the following beneficial effects:

1. The function of a large-capacity battery pack may be implemented by using two battery packs without redesigning a large-capacity battery pack matching the high-pressure cleaning machine. That is, the high power supply of the handheld high-pressure cleaning machine is implemented without changing a battery pack platform used for an existing tool, thereby improving a cleaning capability.

2. The battery pack is compatible with other direct current tools, to implement resource sharing.

3. An arrangement form of double handles facilitates holding by an operator with less effort, thereby effectively reducing arm fatigue during one-hand operation of the operator and improving the work experience of the operator.

DETAILED DESCRIPTION

Figure 1:
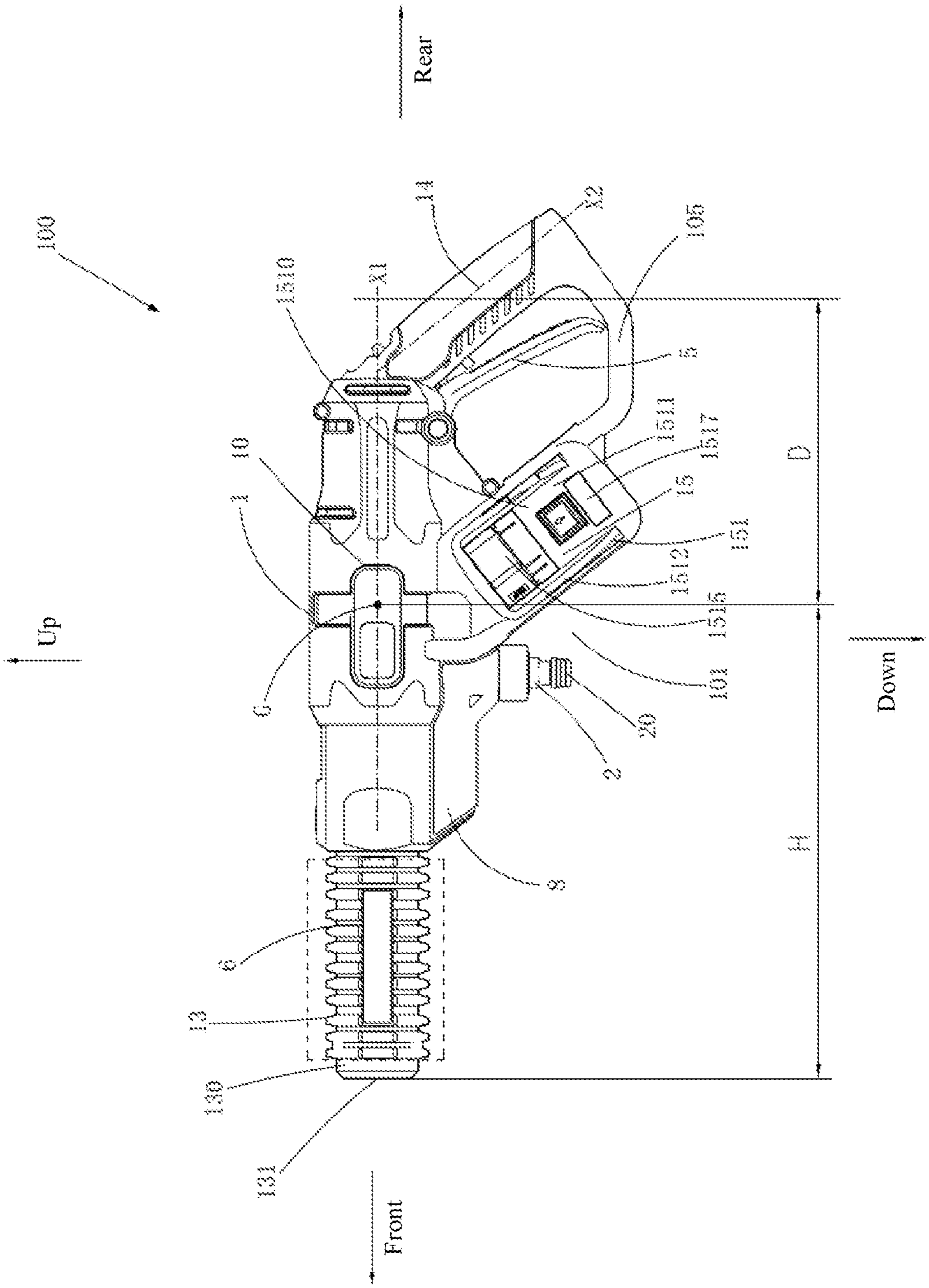
FIG. 1 is a three-dimensional schematic diagram of a handheld high-pressure cleaning machine without mounting a battery pack according to an embodiment of the present disclosure.

The following describes preferred embodiments of embodiments of the present disclosure in detail with reference to the accompanying drawings, so that the advantages and features of the present disclosure can be more easily understood by a person skilled in the art, thereby defining the protection scope of the embodiments of the present disclosure more clearly and explicitly.

As shown in FIG. 1 to FIG. 24 and FIG. 27, a high-pressure cleaning machine 100 is disclosed, and includes a main machine housing 1, a liquid inlet joint 2, a motor 3 (referring to FIG. 27), a pump 4 (referring to FIG. 27), an inlet valve sealing system (not shown in the figure) including a waterway passage, and a trigger mechanism 5.

A structure with a left half and a right half is used for the main machine housing 1, and is formed by connecting a first half housing 11 and a second half housing 12. The main machine housing 1 includes a main body portion 10, a liquid outlet portion 13 disposed at one end of the main body portion 10, and a first handle 14 disposed at the other end of the main body portion 10. That is, the liquid outlet portion 13 is disposed at an end away from the first handle 14. The liquid outlet portion 13 includes a liquid outlet pipe 130 in fluid communication with a cavity of the pump 4, and a liquid outlet 131 is disposed at a free end of the liquid outlet portion 13. In the present invention, the first handle 14 includes a holding portion 141 to be held by an operator, and the main body portion 10 and the first handle 14 are disposed at an angle. Specifically, the main body portion 10 approximately has a cylindrical shape and includes a central axis X1, the first handle 14 also includes a central axis X2, and the two central axes intersect with each other to form an angle. The angle is less than 180 degrees. The angle is configured to enable the main body portion 10 and the first handle 14 to form a mounting space 101.

The motor 3 and the pump 4 are both disposed in the main machine housing 1. Specifically, the motor 3 and the pump 4 are both disposed in the main body portion 10.

One end of the liquid inlet joint 2 may be assembled on the main machine housing 1 or integrally formed with the main machine housing 1, and the other end is suspended and provided with a liquid inlet 20. The liquid inlet joint 2 is connected to an external pipe through which a liquid flows (a water pipe) through the liquid inlet 20 to guide the liquid into the high-pressure cleaning machine 100. Further, in the present invention, the high-pressure cleaning machine 100 in which the motor 3 and the pump 4 are disposed in the main machine housing 1 is a handheld high-pressure cleaning machine. The handheld high-pressure cleaning machine is specifically an integrated spray gun, and the main machine 1 is approximately shaped like a pistol. For a requirement of portability, the handheld high-pressure cleaning machine 100 itself does not include a water tank storing water and is connected to a water pipe (not shown in the figure) through the liquid inlet 20 instead, and then the water pipe (not shown in the figure) is connected to an external water source. The external water source may be a pond, piped water, or provided by a container apparatus similar to a water tank or a barrel. Working scenarios of the handheld high-pressure cleaning machine 100 mainly include a household cleaning scenario and an outdoor activity scenario.

The trigger mechanism 5 is rotatably disposed on the first handle 14 at a connection between the trigger mechanism and the first handle 14 as a support point, and the trigger mechanism 5 is partially accommodated in the main body portion 10. The trigger mechanism 5 is specifically a trigger. The handheld high-pressure cleaning machine 100 further includes a control component (not shown in the figure). The pump 4 and the motor 3 are both connected to the control component. When a cleaning operation needs to be implemented, a cleaning signal may be inputted into the control component through the trigger mechanism 5 and the waterway in the inlet valve sealing system is opened. An external cleaning liquid (water) may pass through the waterway in the inlet valve sealing system under the action of the pump 4 and the motor 3 to be sprayed outward through the liquid outlet 131 to clean the surface of an object.

In the present invention, for ease of understanding, as shown in FIG. 1, a direction in which a water flow is sprayed by the liquid outlet 131 is defined as the front, and a side, away from the liquid outlet 131, of the first handle 14 is defined as the rear, the top of the drawing is defined as the top, and the bottom of the drawing is defined as the bottom. A side outside the drawing is defined as a left side, and a side inside the drawing is defined as a right side. That is, the left side and the right side are marked in FIG. 3. The foregoing definitions are only used for description, and should not be understood as a limitation to the present invention.

In the present invention, a direct current power supply supplies power to the handheld high-pressure cleaning machine 100. Specifically, the direct current power supply may be a rechargeable battery pack 200. The battery pack 200 may be detachably mounted on the main machine housing 1 to supply power to the motor 3. There may be one or two or more battery packs 200. In the implementations described in the present invention, the battery pack 200 includes a first battery pack 201 and a second battery pack 202. The position of the center of gravity of the first battery pack is G1, and the position of the center of gravity of the second battery pack is G2. The rated voltage of each battery pack 201 or 202 is 18 V to 56 V. Preferably, the rated voltage of each battery pack is configured to be 18 V, and the rated capacity of each battery pack may be 2 Ah, 2.5 Ah, 3 Ah, 4 Ah, 6 Ah or 8 Ah. However, in other implementations, according to different requirements for the cleaning performance of the handheld high-pressure cleaning machine 100, the rated voltage of each battery pack may be alternatively 36 V or 42 V, and the rated capacity may be alternatively 2 Ah, 2.5 Ah, 3 Ah, 4 Ah, 6 Ah or 8 Ah. In this case, according to different configurations of the battery pack, the weight of the battery pack may be slightly adjusted.

In the embodiments of the present disclosure, the battery pack 200 is a detachable rechargeable lithium battery pack. The lithium battery pack 200 is at least adaptively connected to two direct current tools of different types. For example, the lithium battery pack may be commonly compatible with electric tools such as a direct current blower, a trimmer, a lawn mower, a chainsaw or a pruning shear. In this embodiment, a user may even buy only a main machine of the handheld high-pressure cleaning machine 100, and use a battery pack of another existing tool (for example, a blower or a trimmer) to adapt to the handheld high-pressure cleaning machine 100, so that energy sharing is implemented for real, to facilitate the compatibility of the battery pack platform. It should be noted that, the battery pack 200 may be alternatively not a lithium battery, but is a nickel hydrogen battery or a nickel cadmium battery instead. In addition, the configuration of two battery packs 200 improves energy reservation of the handheld high-pressure cleaning machine 100, thereby ensuring the cleaning performance of the handheld high-pressure cleaning machine 100 after a single time of charging. Meanwhile, the function of a large-capacity battery pack may be implemented by using two battery packs 200 without redesigning a large-capacity battery pack matching the handheld high-pressure cleaning machine 100. Therefore, the high power supply of the handheld high-pressure cleaning machine 100 is implemented without changing a battery pack platform used for an existing tool, thereby improving a cleaning capability.

The main machine housing 1 further includes a battery pack mounting portion 15 for detachable connection of the battery pack 200, and the quantity of the battery pack mounting portions 15 is the same as the quantity of the battery packs 200. That is, there are two battery pack mounting portions 15. Specifically, the two battery pack mounting portions 15 are defined as a first battery pack mounting portion 151 and a second battery pack mounting portion 152. The battery pack 200 is configured to be connected to or detached from the battery pack mounting portion 15 in a sliding manner. The same reference numeral is used for the first battery pack mounting portions in different embodiments, and the same reference numeral is also used for the second battery pack mounting portions in different embodiments.

The following specifically describes the sliding matching between the battery pack 200 and the battery pack mounting portion 15. Because in the implementations of the present disclosure, the two battery pack mounting portions 15 have the same structure, the two battery packs also have the same structure. For brevity of description, the following only describes the structures of the first battery pack 201 and the first battery pack mounting portion 151 in detail.

Figure 25:
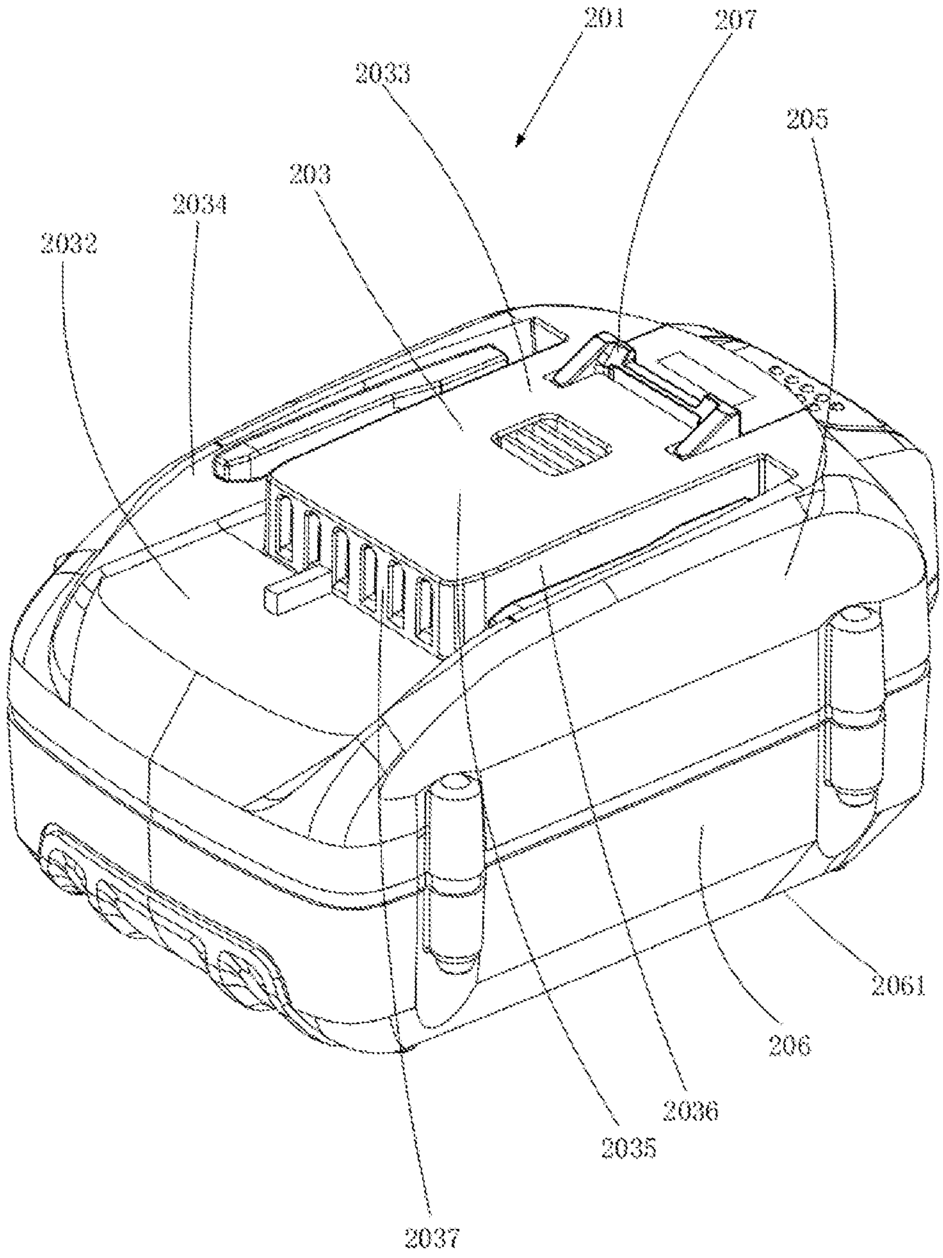
FIG. 25 is a three-dimensional schematic diagram of a single battery pack.
Figure 26:
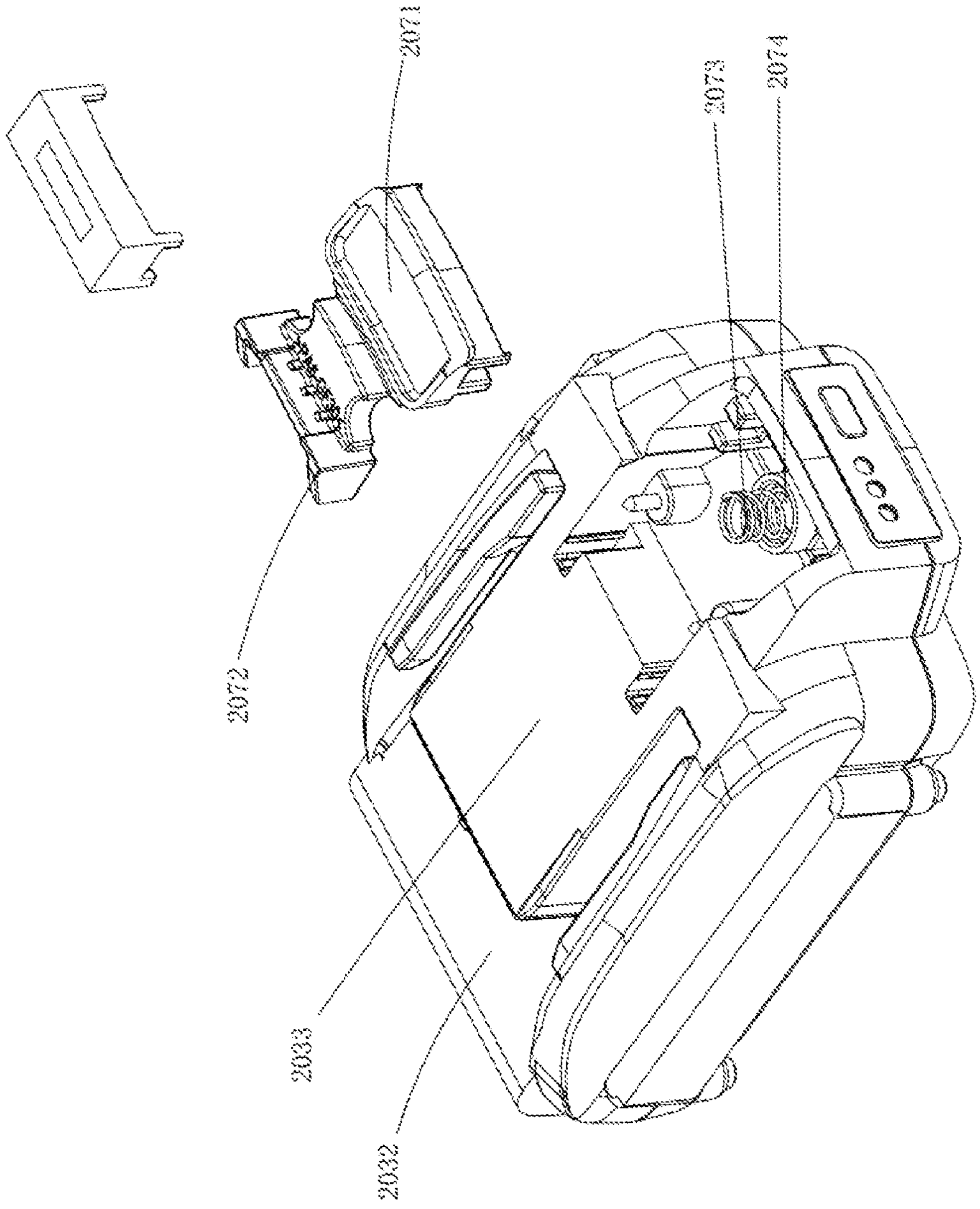
FIG. 26 is a three-dimensional exploded view of the battery pack shown in FIG. 25.

Referring to FIG. 25 and FIG. 26, the battery pack 201 includes a battery pack housing 203 and a battery pack holder (not shown) disposed in the battery pack housing 203. A cell unit (not shown) is accommodated in the battery pack housing 203. The battery pack housing 203 includes an upper housing 205 and a lower housing 206. The upper housing 205 includes an upper surface 2032, a boss 2033 protruding upward from the upper surface 2032, and a pair of mounting guide rails 2034 disposed opposite each other. The boss 2033 includes a top surface 2035, a pair of side surfaces 2036 connecting the upper surface 2032 and the top surface 2035, and a front end surface 2037. The one pair of mounting guide rails 2034 are parallel to each other and extend longitudinally along an outer surface of the battery pack 201, and are respectively formed on left and right sides of the boss 2033. One locking apparatus 207 is disposed on the battery pack housing 203. The locking apparatus 207 is movable relative to the battery pack housing 203, to implement that the battery pack is connected to or detached from the corresponding battery pack mounting portion. Specifically, the locking apparatus 207 includes an operation portion 2071 and a clamping portion 2072. The operation portion 2071 is specifically a button. The button can drive the clamping portion 2072 to move vertically relative to the battery pack housing 203, to implement that the battery pack 200 can be operatively removed from the battery pack mounting portion 15. The lower housing 206 includes a lower surface 2061 disposed opposite the upper surface 2032 of the upper housing 205. The lower surface 2061 and the upper surface 2032 are disposed approximately in parallel to each other.

Further, referring to FIG. 26, an elastic apparatus 2073 is disposed between a bottom surface of the locking apparatus 207 and the upper surface 2032 of the upper housing 205. Preferably, the elastic apparatus 2073 is a spring. The upper surface 2032 of the upper housing 205 is provided with a mounting groove 2074. The spring is at least partially limited in the mounting groove 2074. To remove the battery pack 201 from the battery pack mounting portion 15, the button is pressed to drive the clamping portion 2072 to move downward to be detached from the battery pack mounting portion 15. In this case, the spring applies an upward restoring force to the button due to the pressure of the button. The restoring force is used for restoring the pressed locking apparatus 207 to an original height.

Figure 16:
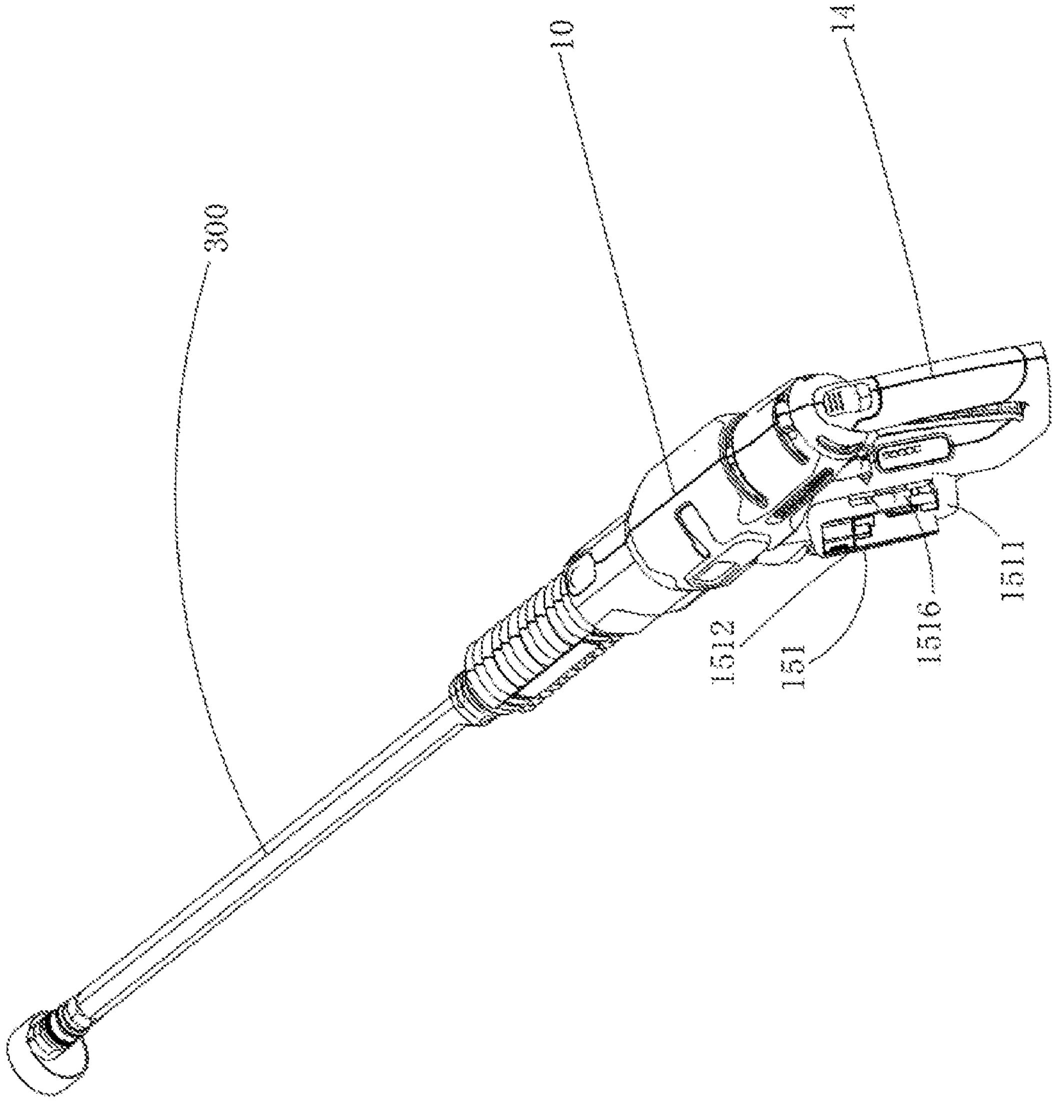
FIG. 16 is a three-dimensional schematic diagram after the handheld high-pressure cleaning machine shown in FIG. 1 is connected to a long-gun spray rod.
Figure 17:
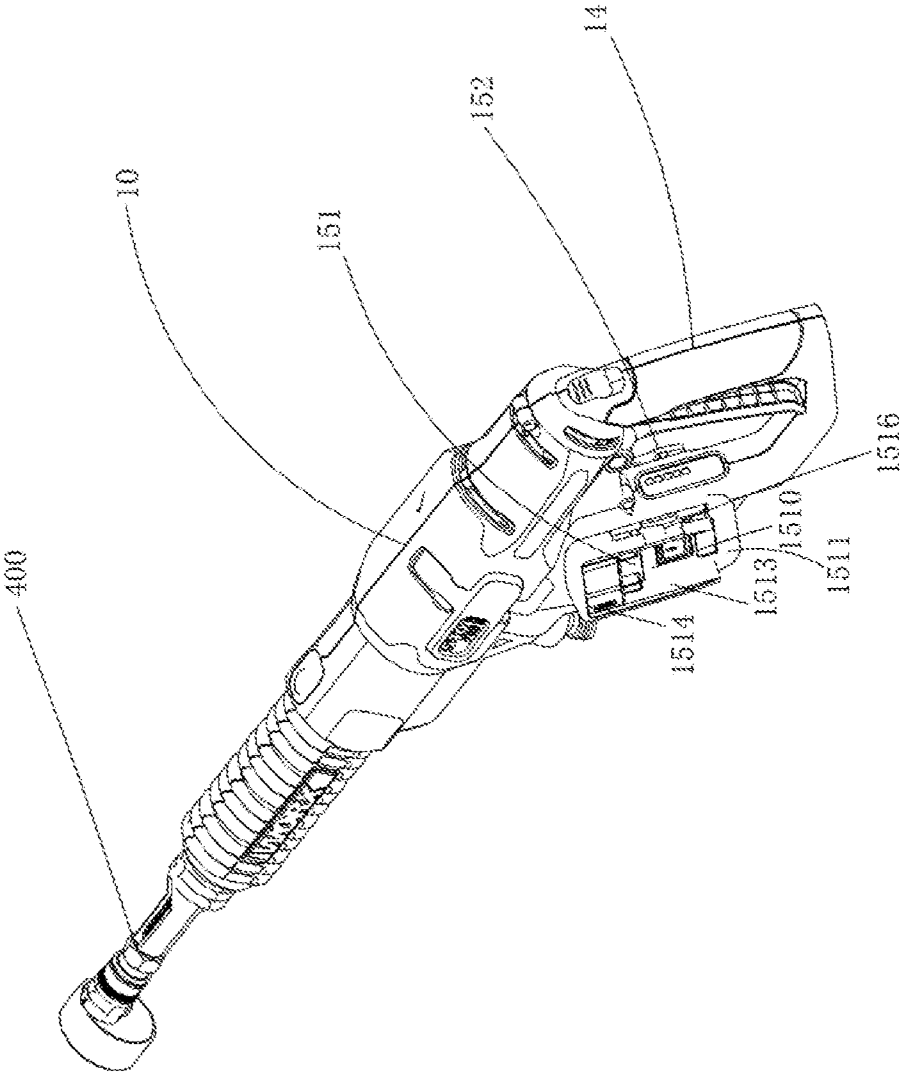
FIG. 17 is a three-dimensional schematic diagram after the handheld high-pressure cleaning machine shown in FIG. 1 is connected to a short gun.

Referring to FIG. 1, FIG. 16, and FIG. 17, the battery pack mounting portion 15 includes a bottom wall 1511, a top wall 1512 disposed opposite the bottom wall 1511, a pair of side walls 1513 disposed opposite each other and extending upward from the bottom wall 1511, and an end wall 1514. The pair of side walls 1513, the end wall 1514, and the bottom wall 1511 define a battery pack accommodation cavity 1510. A tool electrode holder 1515 detachably connected to the battery pack mounting portion 15 may be disposed in the battery pack accommodation cavity 1510. As shown in FIG. 16 and FIG. 17, a battery pack guide rail groove 1516 extending in a length direction is integrally formed on the side wall 1513, and a clamping groove 1517 is formed on the bottom wall 1511, so that the locking apparatus 207 disposed on the battery pack 201 may be clamped with the clamping groove 1517, and it is also ensured that the locking apparatus 207 of the battery pack 201 may be freely detached from the clamping groove 1517. The two battery pack guide rail grooves 1516 are disposed on two sides of the side wall 1513 in parallel. The one pair of mounting guide rails 2034 of the battery pack 201 may respectively slide along the corresponding battery pack guide rail grooves 1516, and may be clamped in the clamping groove 1517 of the battery pack mounting portion 15 through the clamping portion 2072 of the battery pack 201, to enable the battery packs 201 to be electrically connected to the corresponding battery pack mounting portions 15. In the present invention, the battery pack 201 is mounted on the battery pack mounting portion 15, and the bottom wall 1511 of the battery pack mounting portion 15 is opposite the top surface 2035 of the boss 2033 of the battery pack 201. In this implementation, the top wall 1512 of the battery pack mounting portion 15 is defined as a battery pack mounting surface. Certainly, the battery pack mounting surface should be understood as follows: in FIG. 3 and FIG. 4, as observed from the handheld high-pressure cleaning machine 100 from the rear side or the front side, an outermost edge on the left side of the first battery pack mounting portion 151 and an outermost edge on the right side of the second battery pack mounting portion 152.

Figure 27:
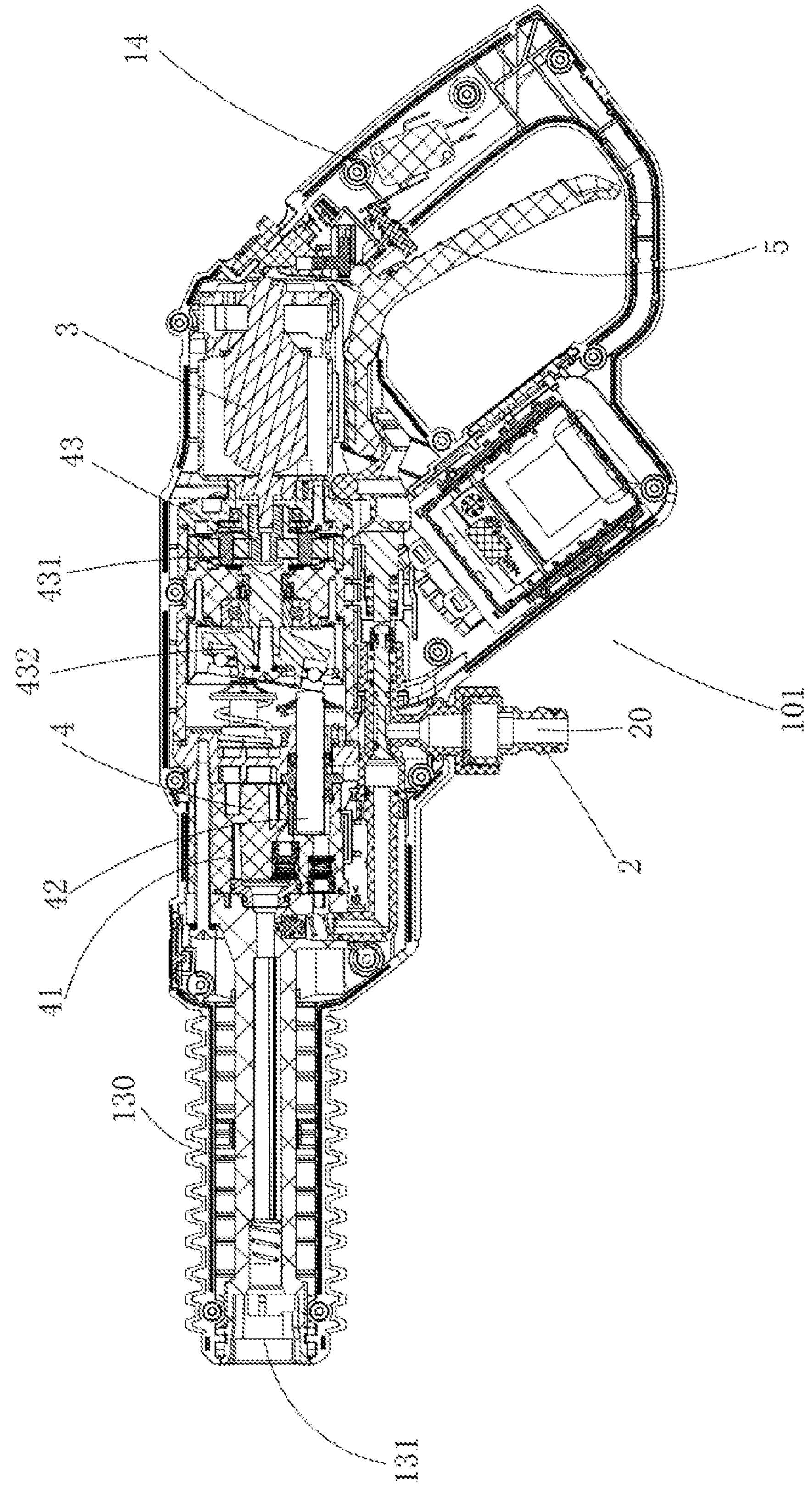
FIG. 27 is a sectional view of the handheld high-pressure cleaning machine shown in FIG. 1.

To improve the cleaning performance of the handheld high-pressure cleaning machine 100, in the present invention, referring to FIG. 27, the pump 4 may be a triple plunger pump. The triple plunger pump includes a pump body 41 and three plungers 42 disposed in the pump body 41. The three plungers 42 reciprocate at a phase difference of 120 degrees from each other. Specifically, in this embodiment, the triple plunger pump needs to be driven by a motor 3 with relatively high power to continuously output a cleaning liquid, so that the rated power of the motor 3 is 220 V to 1200 V, and the weight of the motor 3 is slightly increased. The weight of the motor is less than or equal to 2500 grams (g), and the weight of a single battery pack is less than or equal to 1500 g. Therefore, a total weight range of the handheld high-pressure cleaning machine 100 is 3 kilograms (kg) to 5 kg. In this embodiment, within this total weight range, a working water pressure of the output of the handheld high-pressure cleaning machine 100 is 2 Mpa to 10 Mpa, and a working water flow of the output is 3 L/Min to 8 L/Min. Specifically, in this implementation, the working water pressure of the output of the handheld high-pressure cleaning machine 100 is 3 Mpa, and the working water flow of the output is 3.3 L/Min. In this case, when the handheld high-pressure cleaning machine 100 is in an open state, and the time of continuously spraying a water flow outward by the liquid outlet 131 is 10 minutes (min) to 120 min. Preferably, the rated power of the motor 3 is 360 V, and the weight of the functional component is 1300 g. The rated voltage of each battery pack 201 is 18 V, and the rated capacity is 2 Ah. Two battery packs 201 are connected in series and discharge together to supply driving power to the motor 3. A total weight of the two battery packs 201 is less than or equal to 1000 g, and the total weight (including the two battery packs 200) of the high-pressure cleaning machine 100 is 3.5 kg.

Further, to consider both the cleaning performance and the requirement of the operator for the portability of the handheld high-pressure cleaning machine 100, in the present invention, the triple plunger pump 4 is driven by a motor shaft of a high-speed small motor, to optimize the weight of the handheld high-pressure cleaning machine 100 and improve the portability. The rotation of the motor 3 is converted into the reciprocation of the plungers 42 through a transmission mechanism 43. In the triple plunger pump 4, the efficiency of outputting a cleaning liquid is improved greatly. Certainly, since the three plungers 42 reciprocate, sliding resistance between the three plungers 42 and the pump body 41 is relatively great and power consumption is increased, so that a motor 3 with relatively high rated power is needed to overcome the sliding resistance of the three plungers. Compared with direct use of a relatively heavy low-speed motor with a relatively large volume, in the embodiments of the present disclosure, through appropriate cooperation between a reduction mechanism and the high-speed small motor, the weight and volume of the motor 3 are significantly reduced. Specifically, the transmission mechanism 43 includes a gear reduction mechanism 431 and a swashplate mechanism 432 disposed between the gear reduction mechanism 431 and the pump body 41. A no-load speed of the motor 3 is greater than or equal to 17500 rpm. The swashplate mechanism 432 drives the plungers 42 to reciprocate in the pump body 41. In the present invention, the relatively heavy low-speed big motor is replaced with the relatively light high-speed small motor and the gear reduction mechanism, to reduce the total weight.

As described above, in the handheld high-pressure cleaning machine 100 provided in the present invention, the high-speed motor drives the triple plunger pump to output the cleaning liquid, and the double battery packs supply power to the motor 3. The total weight is approximately between 3 kg to 5 kg. With this weight, when the user operates the machine to work with one hand, arm fatigue may occur soon. To help the user to hold the machine more comfortably and improve work experience of the user, in the present invention, the handheld high-pressure cleaning machine 100 further includes a second handle 6. Specifically, the second handle 6 is at least partially disposed on the periphery of the liquid outlet pipe 130. When the operator uses the handheld high-pressure cleaning machine 100 to perform a cleaning operation, the two handles may be held at the same time. In this case, the weight of the handheld high-pressure cleaning machine 100 is borne by two arms holding the two handles. Compared with the handheld high-pressure cleaning machine with only one handle disposed in the prior art, such an arrangement form of double handles facilitates holding by the operator with less effort, thereby effectively reducing arm fatigue during one-hand operation of the operator, improving the work experience of the operator, and improving the cleaning efficiency at the same time.

The present invention mainly provides two implementations of setting the second handle 6. The following is the detailed description. It should be noted that, the same reference numeral is used for the second handles 6 in different implementations.

Figure 18:
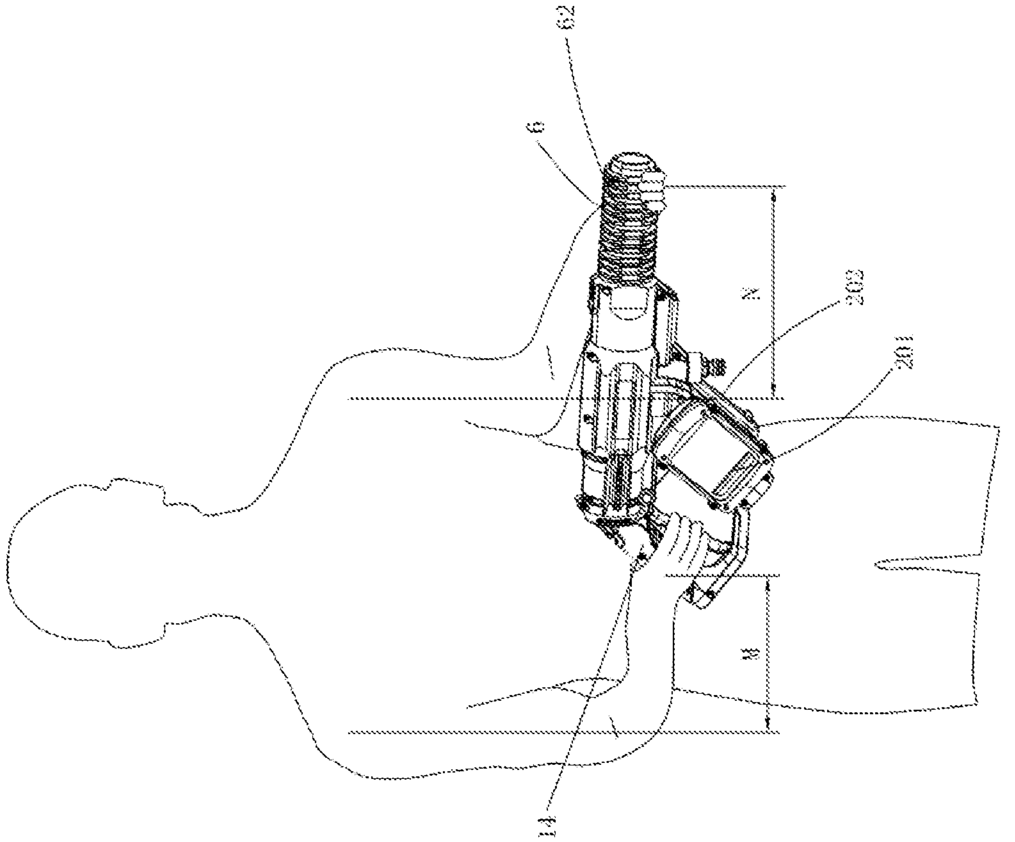
FIG. 18 is a schematic diagram of an operation after a user holds a handheld high-pressure cleaning machine.

A first implementation of arranging the second handle 6 is shown in FIG. 1 and FIG. 18. The second handle 6 is disposed on the main machine housing 1 and close to the liquid outlet 131, and the second handle 6 is provided with a holding portion 62 for the user to hold the machine. The first handle 14 and the second handle 6 are spaced apart on the main machine housing 1, so that when the handheld high-pressure cleaning machine 100 performs a cleaning operation, a stable support structure supported by two points may be formed, to resolves a problem of losing stability due to suspended support at one single point in the past and prevent the main machine housing 1 from overturning, thereby effectively improving the working stability and reliability of the handheld high-pressure cleaning machine. In this way, a cleaning effect is ensured, and a safety risk brought by the instability of the main machine housing is reduced or even avoided, so that the safety performance is greatly improved. In addition, the handheld high-pressure cleaning machine 100 is simple in structure, easy to implement, and low in cost.

Referring to FIG. 1 and FIG. 27 again, in this embodiment, the liquid outlet 131 is disposed at a free end of the liquid outlet pipe 130. The second handle 6 circumferentially covers the outside of the liquid outlet pipe 130. The second handle 6 and the liquid outlet pipe 130 are coaxially disposed. Such an arrangement reduces space occupation of the handheld high-pressure cleaning machine 100 in this embodiment, and reduces the volume of the handheld high-pressure cleaning machine, thereby greatly improving the portability of the handheld cleaning machine 100.

It should be noted that, in this embodiment, "the free end of the liquid outlet pipe 130" refers to an end of the liquid outlet pipe 130 away from the first handle 14, that is, an outermost end for outputting a liquid of the main machine housing 1 of the handheld high-pressure cleaning machine 100.

It should be noted that, a line box in FIG. 1 only represents an example of the position arrangement of the second handle 6 but does not represent an actual structure of the second handle 6. During practical use, the second handle 6 may be disposed to be a circular structure covering the outside of the liquid outlet pipe, and a protruding portion facilitating holding may be disposed at a peripheral of the circular structure, to achieve an objective of holding the second handle 6. Certainly, the second handle 6 may be disposed to be another structure facilitating holding, and the structure of the second handle 6 is not limited in this embodiment.

It should further be noted that, in this embodiment, "the second handle 6 and the liquid outlet pipe 130 are coaxial" is that an extending direction of the second handle 6 and an axial direction of the liquid outlet pipe 130 are coaxial, and the "the axial direction of the liquid outlet pipe 130" is a liquid outlet direction in the liquid outlet pipe 130. When the second handle 6 and the liquid outlet pipe 130 are coaxial, it may be understood that the extending direction of the second handle 6 and the liquid outlet direction in the liquid outlet pipe 130 are parallel to each other.

Figure 19:
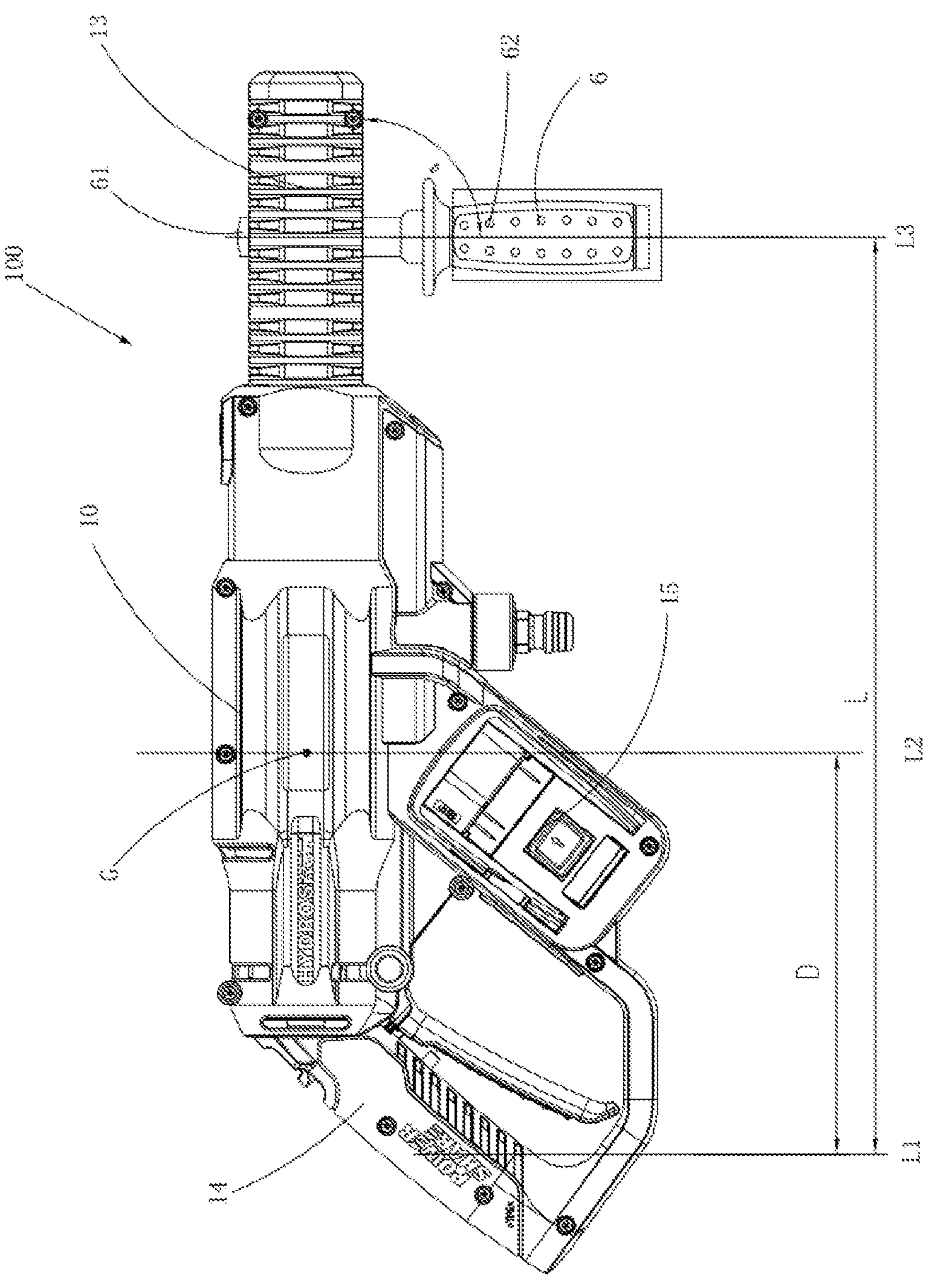
FIG. 19 is a schematic diagram of an implementation of arranging a second handle of a handheld high-pressure cleaning machine.
Figure 20:
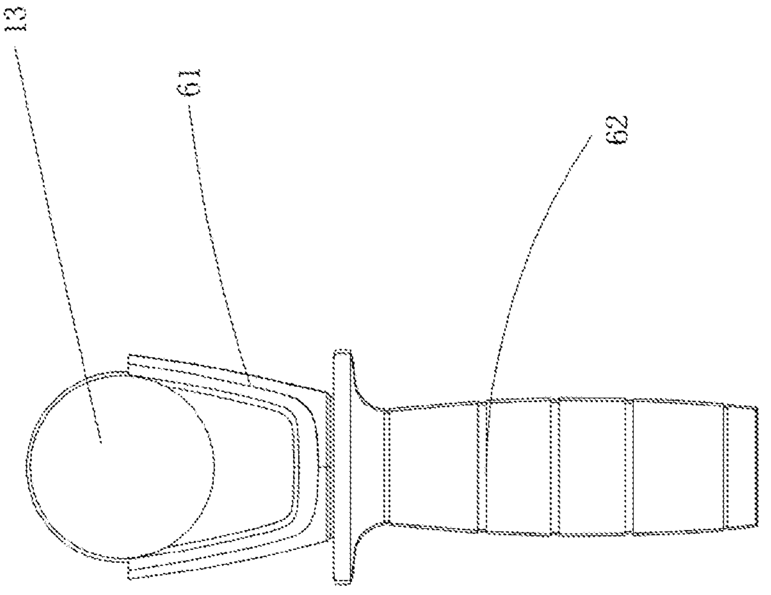
FIG. 20 is a schematic diagram of a specific structure of the second handle in FIG. 19.

A second implementation of arranging the second handle 6 is specifically shown in FIG. 19, and the second handle 6 is an independently additionally disposed element. The second handle 6 and the liquid outlet pipe 130 are disposed at an angle, where a value range of the angle $\alpha$ is 0°<α<180°. Specifically, in this embodiment, α=90°, that is, the second handle 6 is perpendicular to the liquid outlet pipe 130.

It should be noted that, in this embodiment, "the second handle 6 is perpendicular to the liquid outlet pipe 130" is that the extending direction of the second handle 6 is perpendicular to the axial direction of the liquid outlet pipe 130. In addition, the definition of "the axial direction of the liquid outlet portion 13" is the same as the definition of the axial direction of the liquid outlet pipe 130 in the foregoing embodiment.

It should further be noted that, in this embodiment, a form that the second handle 6 is perpendicular to the liquid outlet pipe 130 may be that the second handle 6 in FIG. 18 is vertically disposed to enable the axis of the second handle to be perpendicular to the axis of the liquid outlet pipe 130, but is not limited thereto, and another arrangement form may be alternatively used. For example, as observed from the axial direction of the liquid outlet pipe 130, the second handle 6 tilts, and the axis of the second handle is at an angle with a vertical direction. In this case, the first handle 14 and the second handle 6 are located in different surfaces. Therefore, a double-arm handheld cleaning operation of the entire machine can be implemented through the second handle 6 in such an arrangement form with the assistance of the first handle 14.

Further, in this embodiment, the position of the second handle 6 may be adjusted back and forth in the axial direction of the liquid outlet pipe 130. When the operator uses the handheld high-pressure cleaning machine 100 to perform a cleaning operation, a distance between the first handle 14 and the second handle 6 may be adaptively adjusted as required, to reach an optimal holding distance. Such an arrangement enables the handheld high-pressure cleaning machine 100 in this embodiment to meet use requirements of different operators, to achieve relatively high compatibility.

Specifically, referring to FIG. 20 again, the second handle 6 includes a mounting portion 61 mounted on the liquid outlet pipe 130 in a manner that the position of the mounting portion is adjustable and the holding portion 62 connected to the mounting portion 61. As shown in FIG. 19, the mounting portion 61 is a U-shaped connecting member clamped on the liquid outlet pipe 130 in a direction perpendicular to the axial direction of the liquid outlet pipe 130. The mounting of the second handle 6 on the liquid outlet pipe 130 is implemented through the clamping and fastening between an opening of the U-shaped connecting member and the liquid outlet pipe 130. When the position of the second handle 6 needs to be adjusted, the change of the position of the second handle may be implemented by adjusting the position of the U-shaped connecting member on the liquid outlet pipe 130. Specifically, the operator may translate the second handle 6 in the axial direction of the liquid outlet pipe 130 to implement the change of the position of the second handle, or remove the second handle 6 from the liquid outlet pipe 130, and then mount the second handle at a required position.

In this embodiment, the handheld high-pressure cleaning machine 100 implements the mounting and adjustment of the position of the second handle 6 on the liquid outlet pipe 130 by using the U-shaped connecting member sleeved on the liquid outlet pipe 130, to implement a simple structure, easy control, and low costs. Certainly, in other implementations, the mounting portion 61 may be alternatively in a structural form of the foregoing circular member sleeved on the liquid outlet pipe 130. A connection manner between the holding portion 62 and the mounting portion 61 may be the foregoing fixed connection manner, but is not limited thereto, and may be set to other forms. For example, the holding portion and the mounting portion are hinged, to enable the holding portion to be retracted toward the mounting portion when the handheld high-pressure cleaning machine 100 is not in operation, to implement storage of the holding portion.

The handheld high-pressure cleaning machine 100 further includes a fixing member (not shown) configured to fix the position of the second handle 6. After the position of the second handle 6 is adjusted completely, the second handle 6 may be fixed to the liquid outlet pipe 130 by using the fixing member, to reduce or even avoid an adverse case in which the second handle 6 is detached from the liquid outlet pipe 130 in a cleaning operation process, thereby ensuring the working stability of the handheld high-pressure cleaning machine 100 in this embodiment.

Referring to FIG. 1, FIG. 18, and FIG. 19, in the two implementations of the second handle 6, preferably, a part of the second handle 6 for holding of the user is provided with skidproof stripes. The skidproof stripes may be in an arrangement form of circular protruding texture in FIG. 1 and FIG. 18, or may be an arrangement form of protruding dots in FIG. 19. In another preferred embodiment, a holding region of the second handle 6 may be alternatively provided with rubber coating. A preferred material of the rubber coating is TPE. Such an arrangement ensures the comfort in the handheld operation process, but also increases the contact friction between a hand of the operator and the second handle 6, thereby reducing a risk that the handheld high-pressure cleaning machine 100 slips out of the hand of the operator.

Further, referring to FIG. 1, the handheld high-pressure cleaning machine 100 may be alternatively provided with an auxiliary handle 8. The auxiliary handle 8 is disposed between the second handle 6 and the first handle 14 and is located in the space enclosed by the main body portion 10 and the liquid inlet joint 2. Specifically, the auxiliary handle 8 is disposed below the main body portion 10 and in front of the liquid inlet joint 2. The arrangement of the auxiliary handle 8 and the second handle 6 may enable operators with different arm lengths to comfortably hold the handheld high-pressure cleaning machine 100 to perform cleaning operations. A distance between a lowermost end of the auxiliary handle 8 and a central axis X1 of the main body portion 10 is less than a distance between a lowermost end of the liquid inlet 20 and the central axis X1 of the main body portion 10. Such an arrangement reduces the space occupation of the handheld cleaning machine 100 in this embodiment, and reduces the volume of the handheld high-pressure cleaning machine.

Referring to FIG. 1, FIG. 18, and FIG. 19 again, the center of gravity G of the handheld high-pressure cleaning machine 100 (a state in which battery packs are joined) is located between the first handle 14 and the second handle 6. It should be noted that, in the present invention, the definition of the center of gravity G of the handheld high-pressure cleaning machine 100 is the center of gravity of the handheld high-pressure cleaning machine 100 after two battery packs 200 are joined. When the position of the center of gravity G of the handheld high-pressure cleaning machine 100 is inappropriate, the operability of the machine may be reduced. The center of gravity G of the entire machine is set between the first handle 14 and the second handle 6, so that when the operator holds the handheld cleaning machine 100 by using two arms to implement a cleaning operation, the weight of the handheld high-pressure cleaning machine 100 may be concentrated at the position between the first handle 14 and the second handle 6, to enable the two arms to bear the weight of the machine at the same time, thereby ensuring the balance of the load bearing of the two arms and the stability of the handheld high-pressure cleaning machine 100 in a working process.

FIG. 18 is a schematic diagram of an operator operating the machine with two hands. A distance between a support point of the rear arm (which may be understood as the rear shoulder of the operator) of the operator and the center of the first handle 14 is M. A holding force provided by the rear arm at the first handle 14 is F1 (not shown in the figure). A distance between a support point of the front arm (which may be understood as the front shoulder of the operator) and the center of the second handle 6 is N. A holding force provided by the front arm at the second handle 6 is F2 (not shown in the figure). On one hand, in consideration of the dynamism of the handheld high-pressure cleaning machine 100 in a working process, when the water flow is sprayed forward from the liquid outlet portion 13, the center of gravity of the handheld high-pressure cleaning machine 100 moves forward, to increase the holding force F2 at the second handle 6. On the other hand, since the first handle 14 is close to the operator and the second handle 6 is away from the operator, the front arm of the operator holding the second handle 6 stretches naturally. That is, a torque N generated when the operator holds the second handle 6 is greater than a torque M generated when the operator holds the first handle. In a case that the torque is relatively great, if the holding force is also great, the arm of the operator is prone to fatigue and cannot support a long-time operation.

Therefore, in this embodiment, referring to FIG. 19 again, preferably, the center of gravity G of the handheld high-pressure cleaning machine 100 is designed to be closer to the first handle 14. That is, the distance M between the center of gravity G and the center of the first handle 14 is less than the distance N between the center of gravity G and the center of the second handle 6. Such a design compensates for the difference between torques through different weights borne by the two arms and attempts to ensure the balance between the load bearing of the two arms.

The balance between the load bearing of the two arms of the operator is the first consideration factor for the joint positions of the two battery packs 201 and 202. According to the foregoing consideration factor, as shown in FIG. 19, the two battery packs (the first battery pack 201 and the second battery pack 202) are configured between the first handle 14 and the second handle 6 in a manner that a ratio K of a distance D between the center of gravity G of the handheld high-pressure cleaning machine 100 and the center of the first handle 14 to a straight-line distance L between the center of the first handle 14 and the center of the second handle 6 is within a range of greater than or equal to 35% and less than 50% in the longitudinal direction (or as observed from the left side or the right side). Preferably, a value range of K is 35%≤K≤45%. In such a manner of moving the center of gravity backward, the holding force of the arm at the second handle 6 is effectively reduced, thereby reducing the load bearing at the front arm and relieving the fatigue of the load bearing of the front arm, so that the operator has better use experience.

The center of the first handle 14 should be understood as the center of gravity of the first handle 14 or a holding point of the first handle 14 or a geometric center of the first handle 14, and the center of the second handle 6 should be understood as the center of gravity of the second handle 6 or a holding point of the second handle 6 or a geometric center of the second handle 6. The handheld high-pressure cleaning machine 100 includes a plumb line L2 passing through the center of gravity G of the handheld high-pressure cleaning machine 100, a plumb line L1 passing through the center of the first handle 14, and a plumb line L3 passing through the center of the second handle 6. The distance D should be understood as a longitudinal distance between the plumb line L1 and the plumb line L2, and the distance L should be understood as a longitudinal distance between the plumb line L1 and the plumb line L3. Such a design ensures the balance between the load bearing of the two arms and the stability of the handheld high-pressure cleaning machine 100 in a working process.

Referring to FIG. 19 again, in this embodiment, a value range of the distance L between the center of the first handle 14 and the center of the second handle 6 is: 200 mm≤L≤400 mm. Such an arrangement ensures the portability of the handheld high-pressure cleaning machine in this embodiment in a cleaning operation process and meets an ergonomic design requirement. Specifically, in this embodiment, a preferred value of L is 200 mm, 220 mm, 240 mm, 260 mm, 280 mm, 300 mm, 320 mm, 340 mm, 360 mm, 380 mm or 400 mm.

Certainly, in the handheld high-pressure cleaning machine provided in this embodiment, the distance between the center of the first handle 14 and the center of the second handle 6 may be alternatively another appropriate value. In this embodiment, the length of the holding region of the first handle 14 is not less than 100 mm, and the length of the holding region of the second handle 6 is not less than 100 mm at the same time. Such an arrangement ensures sufficient contact between the hands of the operator and the first handle 14 and the second handle 6, so that the reliability of holding the handheld high-pressure cleaning machine by the operator is ensured in a cleaning operation process, thereby further ensuring a smooth cleaning operation.

It should be noted that, the arrangement is not limited thereto, and another arrangement form may be used. For example, only the length of the holding region of the first handle 14 is set to not less than 100 mm, or only the length of the holding region of the second handle 6 is set to not less than 100 mm.

Referring to FIG. 1 again, in this embodiment, the second handle 6 is disposed in a gun barrel form relative to the main body portion 10. Specifically, in terms of appearance, a shape combined by the second handle 6 and the main body portion 10 is similar to a pistol.

It should be noted that, in this embodiment, the second handle 6 may be the arrangement form of a gun barrel, but is not limited thereto, and another arrangement form such as a cross rod form (not shown in the figure) may be used. Specifically, the extending direction of the second handle 6 is parallel to an extending direction (a liquid outlet direction of the liquid outlet pipe 130) of the main body portion 10. The arrangement form of a cross rod form is a conventional arrangement in this art, and details are not described herein again.

In this embodiment, a lower end of the first handle 14 and the battery pack mounting portion are connected through a connecting rib 105, to form an enclosed D shape, so that the housing of the high-pressure cleaning machine has higher strength and a more stable structure. Specifically, the width of the connecting rib is the same as a width of the holding portion 141 of the first handle 14 in the transverse direction.

In addition, when the handheld high-pressure cleaning machine 100 operates, a high-pressure water flow is sprayed outward from a nozzle to impact the surface of an object. When the water flow impacts the surface of the object, the water flow inevitably splashes backward, especially when the handheld high-pressure cleaning machine is used to clean a high-altitude object. To prevent the battery pack mounting portion and/or the battery pack mounted on the corresponding battery pack mounting portion from being wetted by a water jet splashing backward, the two battery pack mounting portions 15 are disposed at the back in this implementation.

The preventing the splashing of the water flow from affecting the sealing of the battery pack mounting portion 15 and/or the battery pack 200 mounted on the corresponding battery pack mounting portion 15 is a second consideration factor for the design of the joint positions of the two battery packs 201 and 202. Specifically, the center of gravity G of the handheld high-pressure cleaning machine 100 is located between the first handle 14 and the liquid outlet 131, and the first handle 14 is closer to the two battery pack mounting portions 15 than the liquid outlet 131. The center of gravity G of the handheld high-pressure cleaning machine 100 is mainly determined based on the positions of weight objects such as the position of the motor 3, the position of the pump 4, and the positions of the two battery packs 200 mounted on the battery pack mounting portions 15. Therefore, a mounting configuration of the two battery packs 201 and 202 is that as shown in FIG. 1, the first battery pack 201 and the second battery pack 202 are configured between a foremost end of the liquid outlet 131 and the first handle 14 in a manner that a ratio Q of the distance D between the center of the first handle 14 and the center of gravity G of the handheld high-pressure cleaning machine 100 to a distance H between the center of gravity G of the handheld high-pressure cleaning machine 100 and the liquid outlet 131 in the longitudinal direction is less than 1. Preferably, the ratio Q may be greater than or equal to 30% and less than or equal to 80%. Specifically, the ratio Q may be 35%, 40%, 50%, 60%, 70% or 80%. In Such a design, the battery pack mounting portion 15 is located on a relatively rear side of the entire machine and is far from the liquid outlet 131, to provide adequate waterproofing. In addition, when the operator holds the machine with two hands, the front arm of the operator may be used for preventing the splashing water jet from spreading backward.

Figure 8:
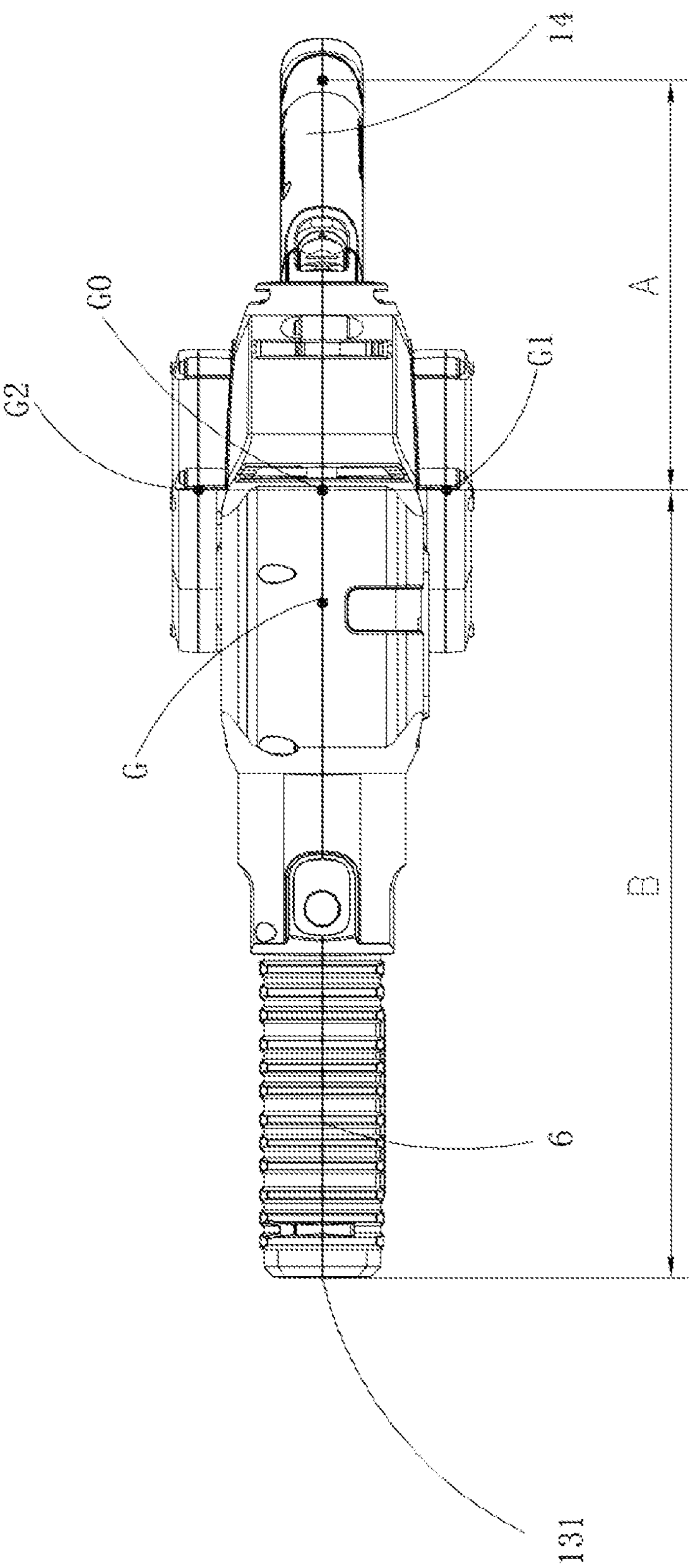
FIG. 8 is a top view after the handheld high-pressure cleaning machine is joined to the battery pack shown in FIG. 6.

In addition, the foregoing solution may be alternatively understood as that, when the battery packs 201 and 202 are attached to the corresponding battery pack mounting portions 15, the battery packs 201 and 202 are relatively far from the liquid outlet 131. Specifically, as shown in FIG. 8, the first battery pack mounting portion 151 and the second battery pack mounting portion 152 are constructed in a manner that a range of a ratio C of a distance A between the combined center of gravity G0 of the first battery pack 201 and the second battery pack 202 and the center of the first handle 14 to a distance B between the combined center of gravity G0 and the foremost end of the liquid outlet 131 is less than 1. Preferably, the ratio C may be 0.3 to 0.6.

It should be noted that, the combined center of gravity G0 of the two battery packs should be understood as a middle point of a connecting line between the center of gravity G1 of the first battery pack and the center of gravity G2 of the second battery pack.

In addition, as described above, the center of gravity G of the handheld high-pressure cleaning machine 100 is mainly determined based on the positions of the weight objects such as the position of the motor 3, the position of the pump 4, and the positions of the two battery packs 200 mounted on the battery pack mounting portions 15. Therefore, in this embodiment, the motor 3, the pump 4, and the two battery packs 200 are distributed in a manner that at least one structure of the motor 3, the pump 4, and the two battery packs 200 is configured on a rear side of the center of gravity G of the handheld high-pressure cleaning machine 100, to balance the position of the center of gravity of the entire machine in the longitudinal direction. The motor 3 and the first battery pack 201 and the second battery pack 202 form an energy component. As shown in FIG. 27, the energy component is placed on a relatively rear side of the handheld high-pressure cleaning machine 100 in the longitudinal direction. Specifically, in this implementation, at least a part of the structure of the battery pack 200 and the entire motor 3 are located on the rear side of the center of gravity G of the handheld high-pressure cleaning machine 100. Preferably, as shown in FIG. 8, the centers of gravity G1 and G2 of the two battery packs 200 are both located on the rear side of the center of gravity G of the entire machine (the entire machine should be understood as a state in which battery packs are joined). Specifically, the first battery pack 201 is inserted in the first battery pack mounting portion 151 in a manner that the center of gravity G1 of the first battery pack 201 is disposed between the center of gravity G of the handheld high-pressure cleaning machine 100 and the center of the first handle 14 in the longitudinal direction. The second battery pack 202 is inserted in the second battery pack mounting portion 152 in a manner that the center of gravity G2 of the second battery pack is disposed between the center of gravity G of the handheld high-pressure cleaning machine 100 and the center of the first handle 14 in the longitudinal direction. In this implementation, the positions of the weight objects are more gather together, and the battery pack 200 mounted on the battery pack mounting portion 15 at least partially overlaps with a projection of the motor 3 on a plane that passes through the central axis X1 and is perpendicular to the vertical direction. The battery pack 200 mounted on the battery pack mounting portion 15 at least partially overlaps with a projection of the pump 4 on a plane that passes through the central axis X1 and is perpendicular to the vertical direction.

In addition, to ensure that the handheld high-pressure cleaning machine 100 can be balanced in the transverse direction even when two battery packs 200 are mounted and maintain relatively adequate operability of the tool, in this design, the two battery packs 200 are mounted in the width direction (that is, the transverse direction) of the main machine housing 1.

The maintaining operation balance of the handheld high-pressure cleaning machine 100 in the transverse direction is a third consideration factor for the design of the joint positions of the two battery packs 201 and 202. Specifically, referring to FIG. 2 to FIG. 13, FIG. 16 to FIG. 19, FIG. 22, FIG. 27, and FIG. 28, the main body portion 10 is provided with a middle plane S, and the main body portion 10 is disposed approximately symmetrically about the middle plane S. The central axis X1 of the main body portion 10 is located in the middle plane S. In the present invention, the middle plane S may be understood as a plane formed by extending a seam at which the first half housing 11 and the second half housing 12 are joined. The two battery pack mounting portions 15 are disposed on left and right sides of the middle plane S in a manner of facing away from each other. That is, the two battery pack mounting portions 15 are configured on the left and right sides of the middle plane S of the main body portion 10 separately in parallel. Specifically, the two battery pack mounting portions 15 are symmetrical with each other about the middle plane S in the transverse direction. In addition, insertion directions of the battery packs 201 and 202 may be the same. According to such a design, the machine is relatively balanced in the transverse direction to ensure the reliability of operations, and the two battery packs 201 and 202 may be mounted and removed in the same direction at one time, to facilitate a disassembly operation of the user.

Figure 2:
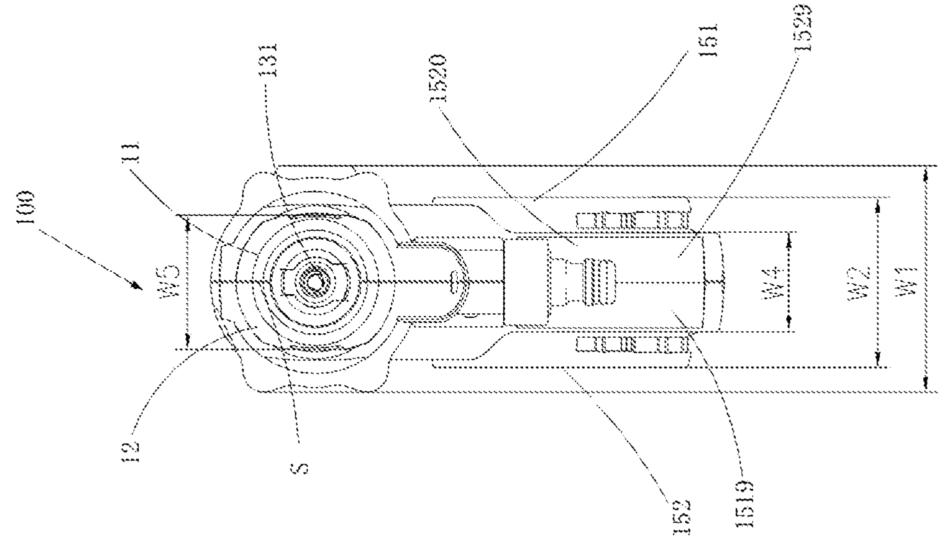
FIG. 2 is a front view of the handheld high-pressure cleaning machine shown in FIG. 1.
Figure 4:
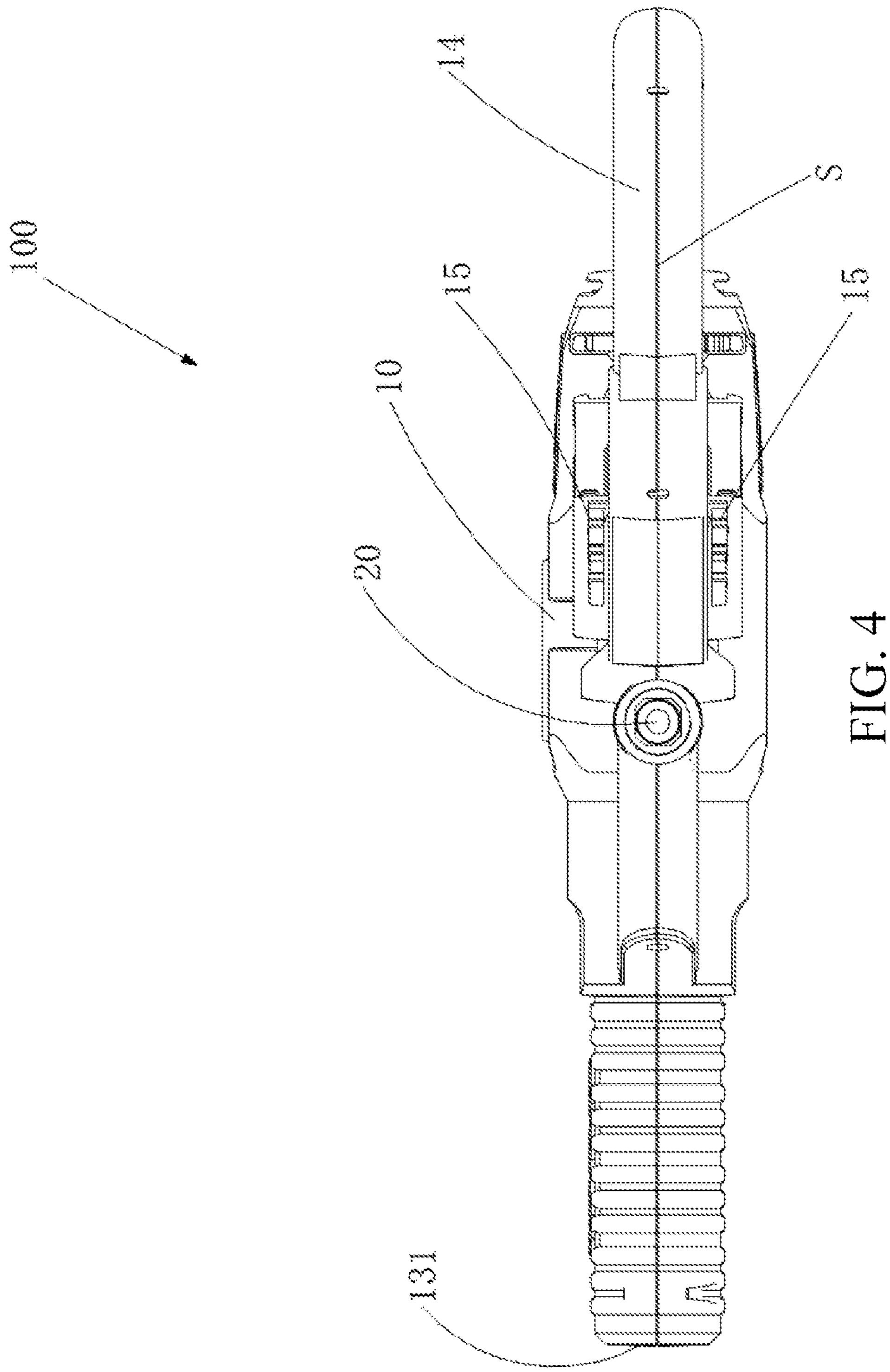
FIG. 4 is a bottom view of the handheld high-pressure cleaning machine shown in FIG. 1.
Figure 5:
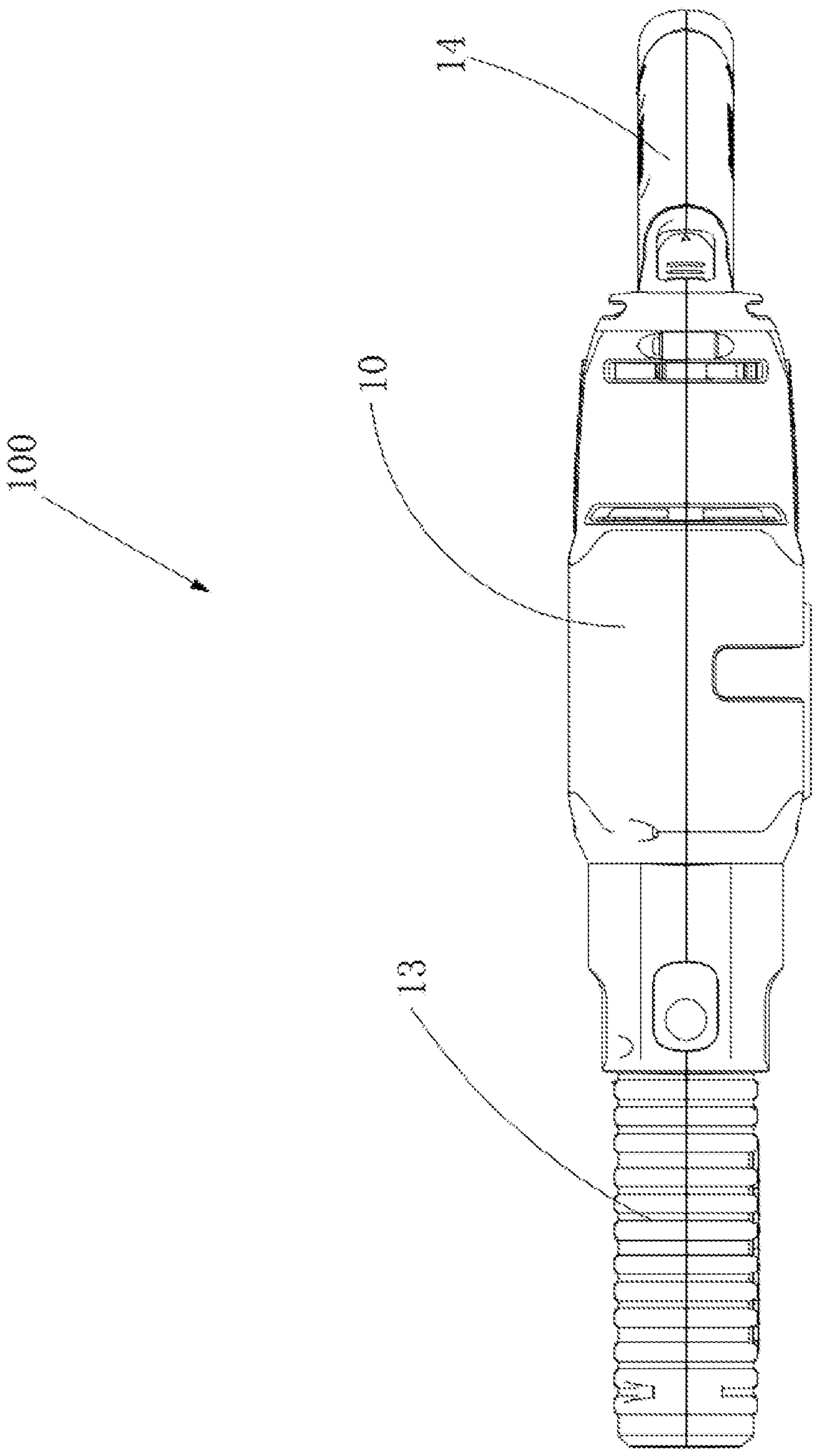
FIG. 5 is a top view of the handheld high-pressure cleaning machine shown in FIG. 1.

Referring to FIG. 2 and FIG. 3 again, a width of the main body portion 10 in the transverse direction is W1, and a maximum distance between the two battery pack main body portions in the transverse direction is W2. To constrain the maximization of the high-pressure cleaning machine 100 in the width direction, preferably, the maximum distance W2 between the two battery pack mounting portions in the transverse direction is not greater than the width W1 of the main body portion 10 in the transverse direction, that is, W2<W1. That is, the two battery pack mounting portions 15 are disposed on the left and right sides of the middle plane S in parallel in a manner that the maximum distance W2 between the two battery pack mounting portions is less than or equal to the width W1 of the main body portion of the handheld high-pressure cleaning machine 100 in the transverse direction. Preferably, in this implementation, W2<W1. That is, the constraining the maximization of the handheld high-pressure cleaning machine 100 in the transverse direction is a fourth consideration factor for the design of the joint positions of the two battery packs 201 and 202 in the present invention.

It should be noted that, the maximum distance W2 herein should be understood as a distance between a leftmost edge of the first battery pack mounting portion 151 and a rightmost edge of the second battery pack mounting portion 152. Further, when mounting surfaces of the two battery packs are both parallel to the middle plane S, the maximum distance W2 herein is a straight-line distance between the mounting surfaces of the two battery packs, namely, the distance between "edges" should be understood as a distance between the surfaces. When the mounting surfaces of the two battery packs are obliquely disposed relative to the middle plane S, in other words, when the mounting surfaces of the two battery packs extend outward relative to the middle plane S, the maximum distance herein should be understood as a distance between outermost extended edges of the mounting surfaces of the two battery packs. In this case, the distance between the "edges" should be understood as a distance between two lines or two symmetrical points.

Figure 3:
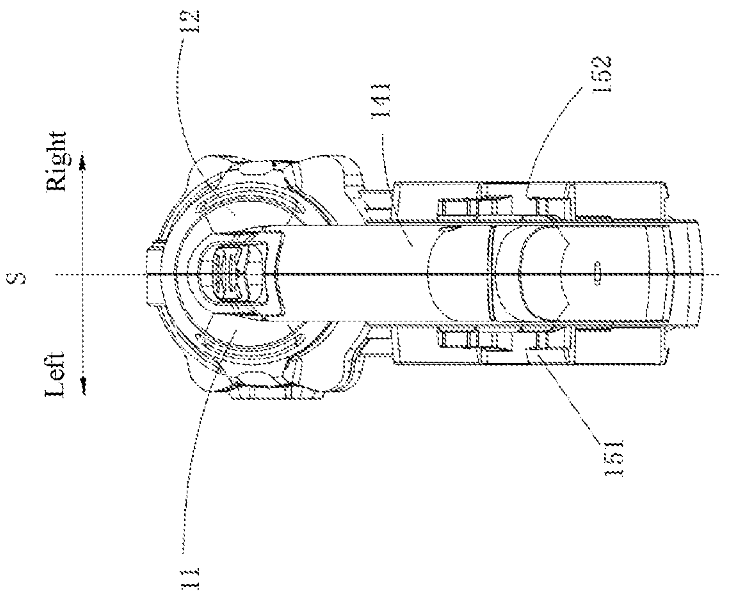
FIG. 3 is a rear view of the handheld high-pressure cleaning machine shown in FIG. 1.

Further, referring to FIG. 3, when the two battery packs are both mounted on the handheld high-pressure cleaning machine 100, as observed from the rear side of the handheld high-pressure cleaning machine, the center of gravity of the handheld high-pressure cleaning machine 100 is within a range of 1 to 1.5 times the width of the holding portion on the left or right side of the middle plane S. In other words, the center of gravity of the handheld high-pressure cleaning machine may be located within a range from 1 to 1.5 times the width of the holding portion 141 offsetting leftward to 1 to 1.5 times the width of the holding portion 141 offsetting rightward of the middle plane. Preferably, the center of gravity of the handheld high-pressure cleaning machine 100 is located on the middle plane S.

The following describes several implementations for the design of the joint positions of the two battery packs 200, and these implementations meet at least one of the four consideration factors.

Referring to FIG. 1 to FIG. 8, FIG. 16 to FIG. 19, FIG. 27, and FIG. 28 again, a first implementation of designing the joint positions of the two battery packs is shown. The four consideration factors are all met in the first implementation. Specifically, the two battery pack mounting portions 151 and 152 are disposed on the left and right sides of the middle plane S and stand side by side, and the battery pack mounting portions 151 and 152 are disposed close to the main body portion 10. More specifically, the two battery pack mounting portions 151 and 152 are located in a mounting space 101 formed by the main body portion 10 and the first handle 14. The two battery pack mounting portions 151 and 152 are located below the main body portion 10, in front of the first handle 14, and behind the liquid inlet joint 2. The first handle 14 and the battery pack mounting portions 151 and 152 are located on the same side of the central axis X1 of the main body portion 10. According to such an arrangement, no additional extension region is required for placing the battery pack 200 in the vertical direction or the transverse direction, and it is ensured that the structure of the entire machine is compact and the volume of the machine is small.

When the two battery packs 201 and 202 are joined to the battery pack mounting portions 151 and 152 in an attachment direction from top to bottom, a distance between the middle plane S of the main body portion 10 and the mounting surface of the battery pack is inevitably not lower than a distance between the middle plane S of the main body portion 10 and a left end surface of the main body portion 10, or a distance between the middle plane S of the main body portion 10 and the mounting surface of the battery pack is inevitably not lower than a distance between the middle plane S of the main body portion 10 and a right end surface of the main body portion 10, to prevent the left end surface of the right end surface of the main body portion 10 from interfering with the insertion of the battery packs 201 and 202, so that the battery packs 201 and 202 can be slidably attached to the battery pack accommodation cavity 1510. However, according to such a design, the entire machine becomes very wide in the transverse direction, and the volume of the entire machine is increased.

It should be noted that, "an attachment direction of the battery packs 201 and 202 from top to bottom" herein may be understood as a direction from a front-upper side to a rear-lower side or from directly above vertical to directly below or a direction from a rear-upper side to a front-lower side. "A left end surface of the main body portion 10" may be understood as a leftmost plane that is away from the middle plane S of the main body portion 10 and parallel to the middle plane S of the main body portion 10. "A right end surface of the main body portion 10" may be understood as a rightmost plane that is away from the middle plane S of the main body portion 10 and parallel to the middle plane S of the main body portion 10. A distance between the left end surface and the right end surface of the main body portion 10 forms the width W1 of the main body portion 10 in the transverse direction.

In view of this, in this implementation, the attachment direction in which the battery packs 201 and 202 are slidably attached to the battery pack mounting portions 151 and 152 is designed as that the first battery pack 201 and the second battery pack 202 are attached to the corresponding battery pack mounting portions 151 and 152 in a manner of sliding from bottom to top. In other words, an opening 1511 provided in the battery pack accommodation cavity 1510 for the sliding attachment of the battery packs 201 and 202 is a downward opening (as shown in FIG. 16 and FIG. 17) without blockage and interference by other elements. According to such a structural design, the two battery pack mounting portions 151 and 152 can be thinned, thereby greatly reducing the size of the entire machine in the width direction. That is, as described above, the maximum distance W2 between the two battery pack mounting portions 151 and 152 in the transverse direction is not greater than the width W1 of the main body portion 10 in the transverse direction.

Figure 6:
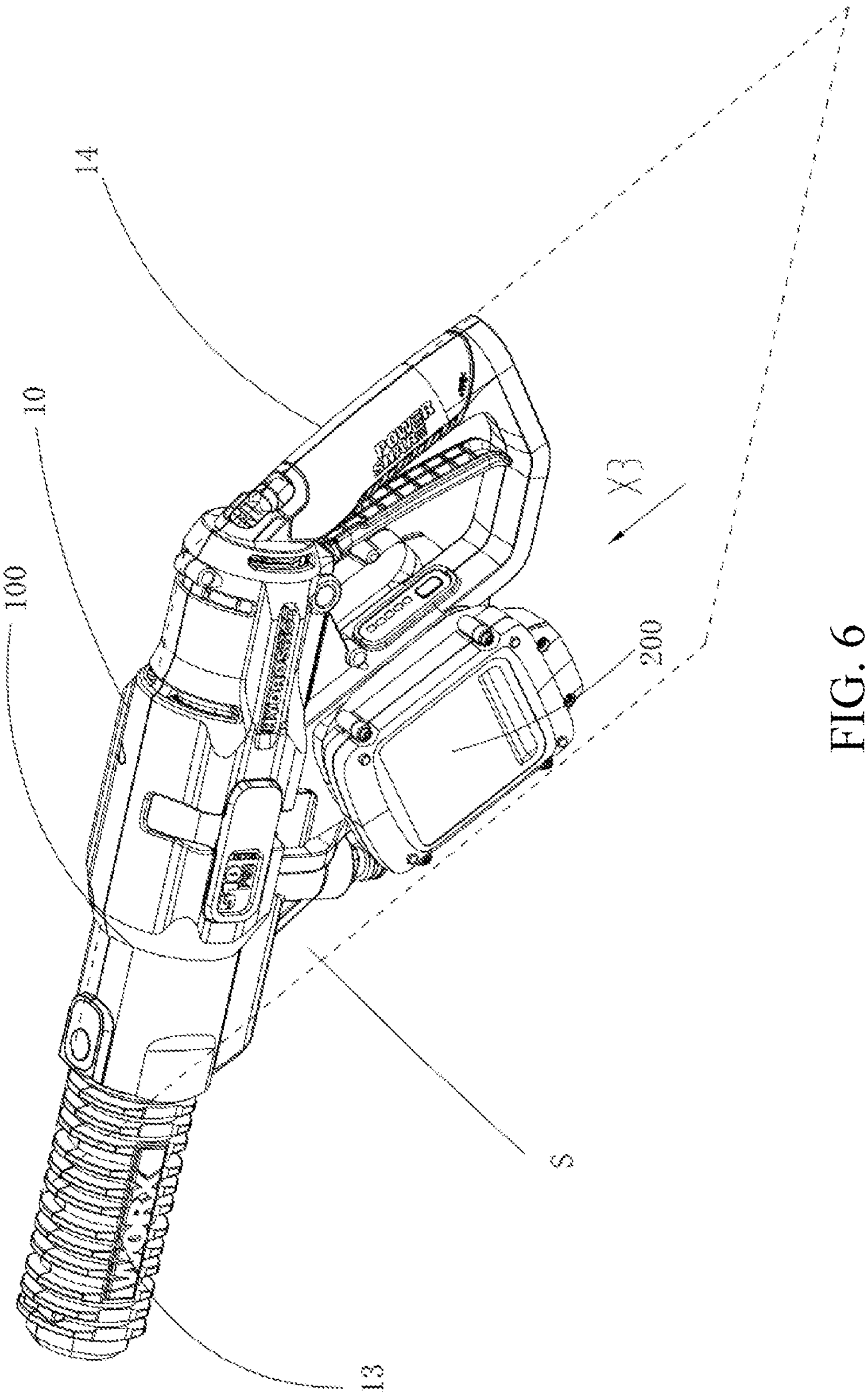
FIG. 6 is a three-dimensional schematic diagram of a first implementation of joining a battery pack to the handheld high-pressure cleaning machine shown in FIG. 1.

It should be noted that, the direction from bottom to top herein may be understood as an oblique upward direction from a rear-lower side or a vertical upward direction from a directly below or an oblique upward direction from a front-lower side. Preferably, the first battery pack 201 and the second battery pack 202 slide obliquely upward from the rear-lower side to be attached to the corresponding battery pack mounting portions 151 and 152 (as shown in FIG. 6). According to such a design, from the perspective of mechanics, the direction of one component force of the gravity of the first battery pack 201 and the second battery pack 202 is a backward direction. In this way, a downward component force is reduced, a supporting force applied by the clamping groove 1517 to the clamping portion 2072 is reduced, and a risk that the first battery pack 151 and the second battery pack 152 are detached from the corresponding battery pack mounting portions 15 is reduced.

Further, as shown in FIG. 1 and FIG. 2, the first battery pack mounting portion 151 includes a first accommodation portion 1519, and the second battery pack mounting portion 152 includes a second accommodation portion 1529. The bottom walls 1511 of the two battery pack mounting portions are respectively formed on the corresponding first accommodation portion 1519 and the corresponding second accommodation portion 1529. The first accommodation portion 1519 and the second accommodation portion 1529 are symmetrically disposed about the middle plane S. The first accommodation portion 1519 and the second accommodation portion 1529 are joined to form a sole portion 1520, and the sole portion 1520 includes a hollow mounting cavity configured to mount a control component. In this implementation, to constrain the maximization of the handheld high-pressure cleaning machine 100 in the width direction, the sole portion 1520 is relatively thin. Specifically, as shown in FIG. 2, a width W4 of the sole portion 1520 in the transverse direction is not greater than a width W5 of the liquid outlet portion 13 in the transverse direction. According to such a design, even when the handheld high-pressure cleaning machine 100 is in a state that the battery pack 200 is joined, the entire machine is very compact in the transverse direction.

Figure 28:
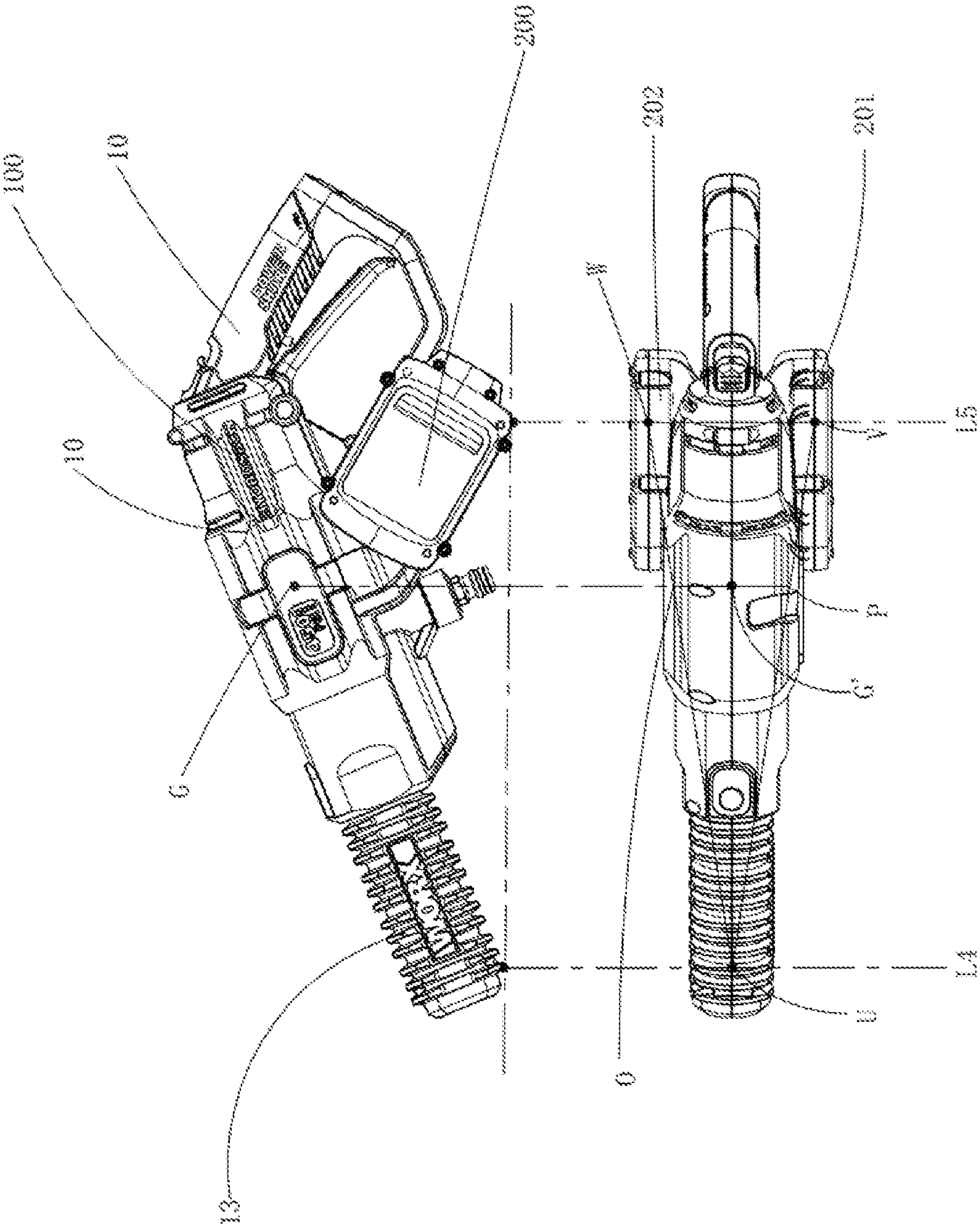
FIG. 28 is a three-dimensional diagram when a handheld high-pressure cleaning machine is in a standing state after a battery pack is joined and a corresponding top view.

In addition, when the handheld high-pressure cleaning machine 100 needs to be placed, at least two support points need to be selected to be in contact with the ground or a working surface (a support plane), and the two support points should be distributed on the front and rear sides. The handheld high-pressure cleaning machine 100 is stably placed on the ground or the working surface through the cooperation between the support points distributed on the front and rear sides. Referring to FIG. 2 and FIG. 28, a part, in contact with the ground or the working surface (the support plane), of the liquid outlet portion 13 is used as a first support point U. For the selection of the rear support point, considering that in this implementation, the width of the sole portion 1520 is relatively thin, and the positions of the weight objects such as the position of the motor 3, the position of the pump 4, and the positions of the two battery packs 200 are all relatively close to the sole portion 1520, so that the relatively thin sole portion 1520 cannot cooperate with the first support point U, to stably place the handheld high-pressure cleaning machine 100.

In this implementation, the arrangement of the two battery packs 200 is properly used to implement the stable placement of the handheld high-pressure cleaning machine 100 even in a case that the handheld high-pressure cleaning machine is connected to the battery packs 200. In addition, the inventor further finds that the position of the center of gravity G of the entire machine is associated with whether the handheld high-pressure cleaning machine 100 with which the battery packs 200 are connected can be stably placed on the ground or the working surface, and description is made below in detail.

Since the first battery pack 201 and the second battery pack 202 are both disposed close to the rear side, and the first battery pack 201 and the second battery pack 202 are symmetrically distributed on two sides of the middle plane S, the two battery packs 200 may be respectively mounted on the corresponding battery pack mounting portions 151 and 152. A part of the first battery pack 201 which in contact with the support plane is used as a second support point V, and a part of the second battery pack 202 which in contact with the support plane is used as a third support point W. Specifically, as shown in FIG. 28, the first support point U, the second support point V, and the third support point W are connected end to end to form a triangle. More specifically, the first support point U is located on an extended surface of the middle plane S, and the second support point V and the third support point W are symmetrical about the middle plane S. Therefore, the triangle formed by the three support points is an isosceles triangle. When the center of gravity G of the entire machine is located in the triangle formed by the three support points, the entire machine may be stably placed by using a triangular stability principle. When the center of gravity G of the entire machine is not located in a space enclosed by the three support points, the entire machine cannot be stably placed.

An implementation of the second support point V and the third support point W is that the second support point V and the third support point W are a line. In other words, an edge, in contact with the ground or the working surface, of the first battery pack 201 is linear contact. An edge, in contact with the ground or the working surface, of the second battery pack 202 is also linear contact. In this case, a distance between a leftmost edge of the second support point V and a rightmost edge of the third support point W is the width of a bottom edge V-W of the triangle shown in FIG. 28.

Another implementation of the second support point V and the third support point W is that, the second support point V and the third support point W are both fixed points. In other words, the edge, in contact with the ground or the working surface, of the first battery pack 201 is an arc, and the contact between the first battery pack 201 and the ground or the working surface is point contact. The edge, in contact with the ground or the working surface, of the second battery pack 202 is also an arc, and the contact between the second battery pack 202 and the ground or the working surface is point contact. In this case, the distance between the two fixed points in the transverse direction is the length of the bottom edge V-W of the triangle shown in FIG. 28.

Certainly, the support points, in contact with the ground or the working surface, of the two battery packs 200 may be alternatively in other forms.

Further, in this implementation, the width of the liquid outlet portion 13 in the transverse direction is relatively small. Specifically, the width of the liquid outlet portion 13 in the transverse direction is approximately 40 mm to 55 mm. To ensure that the three support points stably support the entire machine, a maximum length V-W between the second support point V and the third support point W in the transverse direction is greater than a maximum width of the liquid outlet portion 13.

Figure 7:
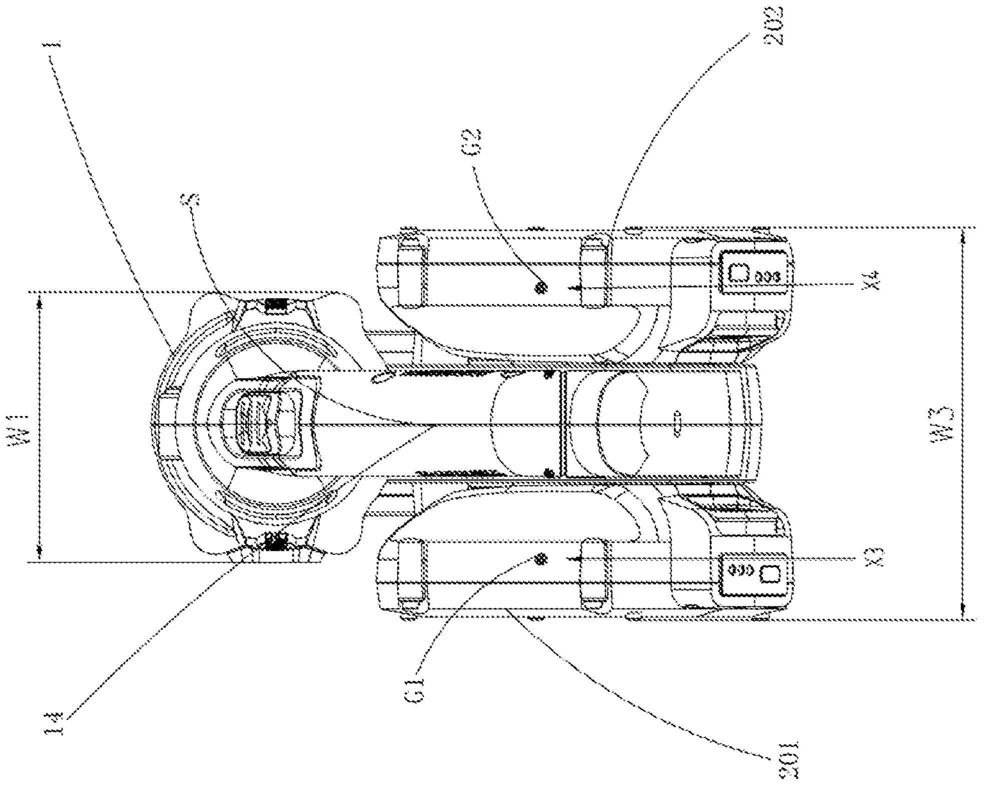
FIG. 7 is a rear view after the handheld high-pressure cleaning machine is joined to the battery pack shown in FIG. 6.

As described above, in this implementation, the attachment direction in which the battery packs 201 and 202 are slidably attached to the battery pack mounting portions 151 and 152 is designed as that the first battery pack 201 and the second battery pack 202 slide obliquely upward from the rear-lower side to be attached to the corresponding battery pack mounting portions 151 and 152. Therefore, as shown in FIG. 28, the second support point V may be determined as being located at a left-lower end of the first battery pack 201, and the third support point W may be determined as being located at a right-lower end of the second battery pack 202. Referring to FIG. 7 and FIG. 28, the second support point V is located on the rear side of the center of gravity G1 of the first battery pack 201, the third support point W is located on the rear side of the center of gravity G2 of the second battery pack 202, and as described above, the center of gravity G1 of the first battery pack 201 and the center of gravity G2 of the second battery pack 202 are both located on the rear side of the center of gravity G of the entire machine. Therefore, a projection G' of the center of gravity G of the entire machine on the ground or the working surface is necessarily located on the front side of the second support point V and the third support point W. Certainly, in other implementations, the projection G' of the center of gravity G of the entire machine on the ground or the working surface may be alternatively located on a line segment formed by the second support point V and the third support point W through connection.

Further, in this implementation, the weight of the motor 3 is approximately 435 g, the weight of the pump 4 is approximately 1 kg, the weight of one single battery pack is approximately 400 g, and the specifications of the two battery packs 200 are the same, so that the weight of the two battery packs 200 is 800 g. Considering that the center of gravity G of the handheld high-pressure cleaning machine 100 is mainly determined based on the positions of the weight objects such as the position of the motor 3, the position of the pump 4, and the positions of the two battery packs 200 mounted on the handheld high-pressure cleaning machine 100. The motor 3 and the pump 4 are both located in the main body portion 10, and a sum of weights of the motor 3 and the pump 4 is greater than a sum of weights of the two battery packs 200. Therefore, the center of gravity G of the entire machine should be located in the main body portion 10.

Further, to consider both a relatively small width size of the entire machine and stable support of the three support points, a side U-V (that is, a lateral side of the isosceles triangle) formed by the first support point U and the second support point V through connection, a side U-W (that is, another lateral side of the isosceles triangle) formed by the first support point U and the third support point W through connection. A range of an angle formed by the side U-V and the side U-W is 20 degrees to 45 degrees, for example, 30 degrees, 35 degrees or 40 degrees.

In this implementation, a structure with a left half and a right half is used for the main machine housing 1, and there is only a little difference between the first half housing 11 and the second half housing 12 of the main machine housing 1. For element parts accommodated in the main machine housing 1, there is a little difference between the weight of the element parts located in the first half housing 11 and the weight of the element parts located in the second half housing 12. In addition, the two battery packs 200 joined to the main machine housing 1 are arranged on the left and right sides and have the same specifications. Therefore, an amplitude that the center of gravity G of the handheld high-pressure cleaning machine 100 deviates leftward or rightward from the middle plane S is modest. Specifically, as shown in FIG. 28, the three support points construct a plane Z (not marked) through connection, and the two battery packs 200 are mounted on the corresponding battery pack mounting portions in a manner that a projection G' of the center of gravity G of the entire machine on the plane Z is configured to be located on a perpendicular line of the triangle, or a size range in which the projection G' deviates leftward or rightward from the perpendicular line of the triangle is not greater than a half of the size of the bottom side V-W of the triangle in the transverse direction. It should be noted that the perpendicular line herein is the perpendicular line drawn from the first support point U to the opposite side of the first support point U. That is, the perpendicular line is the altitude to the bottom side V-W. In addition, an intersection of the perpendicular line and the bottom side V-W is the foot of the altitude.

Specifically, in an implementation, the projection G' of the center of gravity G of the entire machine on the plane Z formed by the triangle may be configured to bias leftward or rightward at a distance of a half of the size of the bottom side V-W of the triangle. That is, the projection G' overlaps with the point V or W. In another implementations, the projection G' is located in a region formed by the three sides of the triangle, and a distance at which the projection G' bias leftward or rightward is less than a half of the size of the bottom side V-W of the triangle.

Preferably, as shown in FIG. 28, the two battery packs are mounted on the corresponding battery pack mounting portions in a manner that the projection G' of the center of gravity G of the entire machine on the plane Z is configured to be located on the perpendicular line of the triangle, or a ratio of a size at which the projection G' bias leftward or rightward from the perpendicular line of the triangle to the size of the bottom side V-W of the triangle is 0.55 to 0.8. The ratio may be 0.6, 0.65, 0.7, 0.75 or the like. Preferably, the ratio is 0.68. Specifically, in this implementation, the size range in which the projection G' of the center of gravity G of the entire machine on the plane Z bias leftward is configured to be not greater than the length of G'P. The size range in which the projection G' of the center of gravity G of the entire machine on the plane Z bias rightward is configured to be not greater than the length of G'O.

It should be noted that, the distance at which the projection G' of the center of gravity G of the entire machine on the plane Z bias leftward or rightward from the perpendicular line of the triangle needs to be configured to ensure that G' is located in the triangular plane enclosed by the triangle.

For the implementation that the three support points construct an isosceles triangle, a ratio of a distance between the projection G' of the center of gravity G of the entire machine on the plane Z and a plumb line L4 at which the first support point U is located to a distance between the plumb line L4 and a straight line L5 at which the triangle bottom side formed by the second support point V and the third support point W through connection is configured to be 0.55 to 0.8. Preferably, as shown in FIG. 28, the projection G' of the center of gravity G of the entire machine on the triangular plane Z is configured to be located on the perpendicular of the triangle, or the projection G' bias leftward or rightward from the perpendicular line of the triangle. The ratio may be 0.6, 0.65, 0.7, 0.75 or the like. Preferably, the ratio is 0.68.

According to such a design, after the two battery packs 200 are mounted, the handheld high-pressure cleaning machine 100 may be in a stable standing state, and does not tilt leftward or rightward or tilt forward or backward.

FIG. 8 is a top view after the two battery packs 200 are joined to the handheld high-pressure cleaning machine 100. In this implementation, a distance between the two battery pack mounting portions 151 and 152 in the width direction (the transverse direction) is relatively small. Therefore, even the handheld high-pressure cleaning machine 100 is in a state in which the battery packs 200 are joined, the entire machine is quite compact in the transverse direction. Specifically, as shown in FIG. 7, a range of a ratio of a width W3 of the first battery pack 201 and the second battery pack 202 in the transverse direction to the width W1 of the main body portion 10 in the transverse direction is 1.2 to 2. Preferably, the ratio is 1.5. More specifically, when one group of battery packs are respectively assembled on the two battery pack mounting portions, a range of a width by which the handheld high-pressure cleaning machine increases in the left direction or right direction is 17 mm to 47 mm.

Referring to FIG. 6 and FIG. 7 again, X3 indicates an axis of the first battery pack 201 attached to the first battery pack mounting portion 151 through sliding, and the axis passes through the center of gravity G1. X4 indicates an axis of the second battery pack 202 attached to the second battery pack mounting portion 152 through sliding, and the axis passes through the center of gravity G2. The axis X3 and the axis X4 are approximately parallel to an extending direction of a central axis of the first handle 14. In addition, the axis X3 and the axis X4 are approximately parallel to the middle plane of the main body portion, and are disposed approximately symmetrically about the middle plane S of the main body portion 10. In other words, the two battery packs 201 and 202 both slide from the rear-lower side to the front-upper side to be attached to the corresponding battery pack mounting portions 151 and 152.

Certainly, the axis X3 and the axis X4 and the middle plane S of the main body portion 10 may be alternatively constructed as nonparallel arrangement. Specifically, an extending direction of the axis X3 may intersect with the middle plane S to form a first acute angle, an extending direction of the axis X4 may intersect with the middle plane S to form a second acute angle, and the first acute angle is equal to the second acute angle. In addition, a sum of the first acute angle and the second acute angle is still an acute angle. In other words, the axis X3 and the axis X4 are set symmetrical about the middle plane S of the main body portion 10, and the two battery packs 201 and 202 may slide from the lower-rear side to the upper-front side to be attached to the corresponding battery pack mounting portions 151 and 152.

In the following embodiments, at least one of the foregoing four consideration factors is considered in a design of the joint positions of the two battery packs, and main differences between the design and the first implementation lie in a specific position relationship between the battery pack mounting portion and the main body portion 10 and an assembling direction of the battery pack 200.

Figure 9:
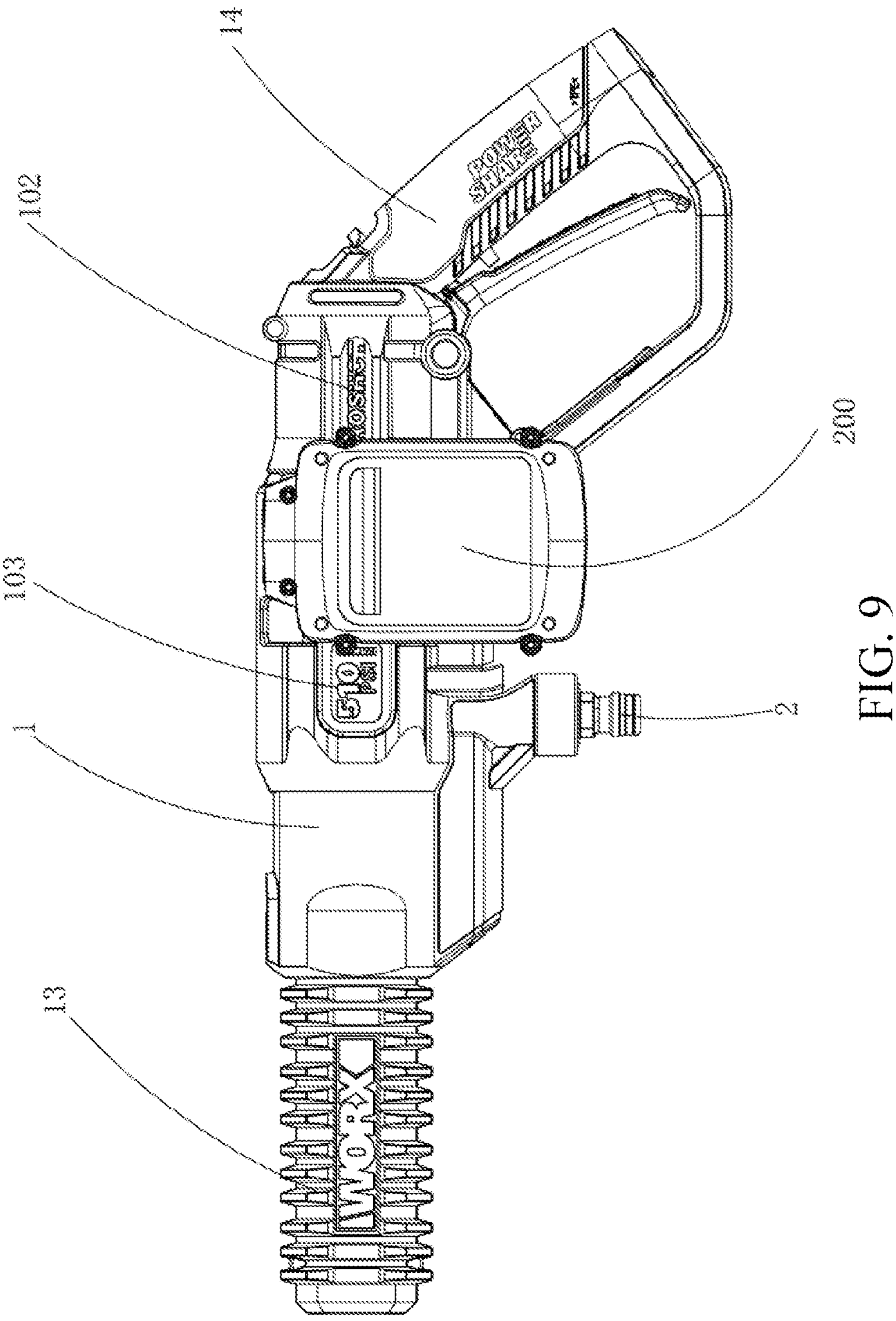
FIG. 9 is a three-dimensional schematic diagram of a second implementation of joining a battery pack to the handheld high-pressure cleaning machine.
Figure 10:
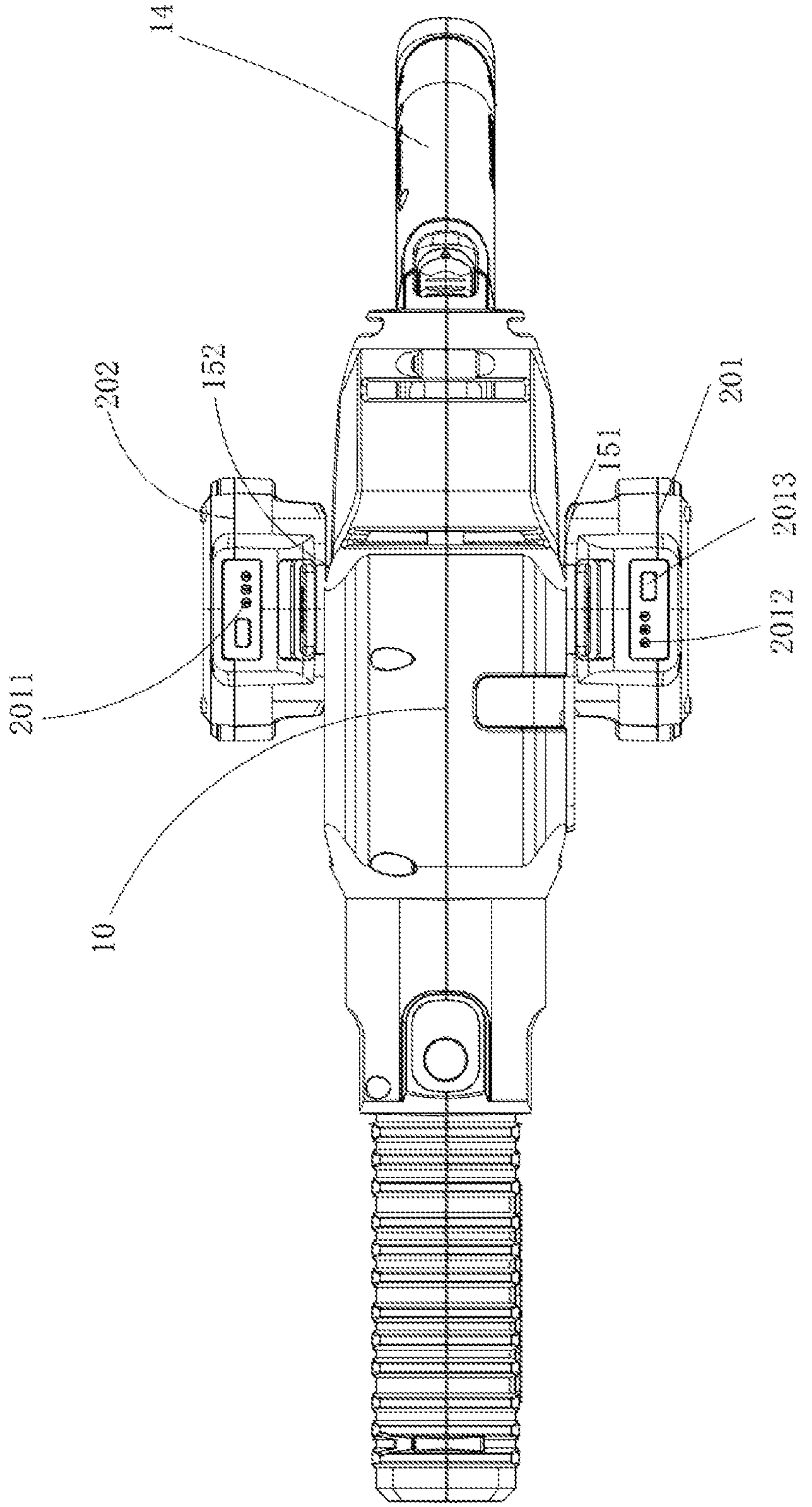
FIG. 10 is a top view after the handheld high-pressure cleaning machine is joined to the battery pack shown in FIG. 9.

Specifically, FIG. 9 and FIG. 10 are a second implementation of the joint positions of the two battery packs 200, and this implementation at least meets three of the four consideration factors. In this implementation, the two battery pack mounting portions 151 and 152 disposed on the main machine housing 1 are at least partially configured on the main body portion 10. Further, the main body portion 10 includes a motor housing 102 accommodating the motor 3 and a pump housing 103 accommodating the pump 4. The at least two battery pack mounting portions 151 and 152 are at least partially configured on left and right sides of the pump housing 103. In other words, in this implementation, the distance between the two battery pack mounting portions 151 and 152 is greater than the width of the main body portion 10 in the transverse direction. According to such a design, the width of the entire machine in the transverse direction is increased relatively. However, the two battery pack mounting portions 151 and 152 are configured around the pump housing 103, and distances between the two battery pack mounting portions 151 and 152 and the pump 4 are greater than distances between the two battery pack mounting portions and the motor 3. In an operation process of sucking cold water of the handheld high-pressure cleaning machine 100, a cleaning liquid (when the sucked cleaning liquid is natural cold water from a pond, a tap or a tank) flowing through the pump 4 may deliver cold air to the battery packs attached to the battery pack mounting portions 151 and 152, to cool heat dissipated by the battery packs 201 and 202 during use.

In addition, in this implementation, the attachment direction of the two battery packs 201 and 202 may be designed as that: the two battery packs 201 and 202 are slidably joined to the battery pack mounting portions 151 and 152 from top to bottom. The direction from top to bottom herein may be understood as oblique insertion from the front-upper side to the rear-lower side or oblique insertion from the rear-upper side to the front-lower side or vertical insertion from directly above to directly below. According to such a design, the attached battery packs 201 and 202 may be prevented from being detached from the battery pack mounting portions 151 and 152. Preferably, the attachment direction of the battery packs 201 and 202 is that the battery packs are slidably attached to the corresponding battery pack mounting portion vertically downward from the directly above. The attachment direction of the battery packs is opposite to a direction in which an external water source is introduced into the liquid inlet 20. The battery pack mounting portion is configured to allow the battery pack to be configured between the liquid inlet joint 2 and the first handle 14.

In addition, in this embodiment, there may be two types of position relationships between the attachment direction of the battery packs 201 and 202 and the middle plane S of the main body portion 10. Referring to FIG. 9 and FIG. 10, for the first type, the attachment direction of the battery packs 201 and 202 is set parallel to the middle plane S. For the second type, the attachment direction of the battery packs 201 and 202 intersects with the middle plane S (not shown in the figure). Reference may be made to the description in the first implementation for the first type. The axis passing through the center of gravity of the first battery pack 201 is approximately parallel to the middle plane S, and the axis passing through the center of gravity of the second battery pack is also approximately parallel to the middle plane S. Reference may be made to the description in the first implementation for the second type. The axis passing through the center of gravity of the first battery pack 201 intersects with the middle plane S to form a first acute angle, and the axis passing through the center of gravity of the second battery pack intersects with the middle plane S to form a second acute angle. The first acute angle is equal to the second acute angle. In addition, a sum of the first acute angle and the second acute angle is still an acute angle.

In addition, as shown in FIG. 10, the battery pack 201 further includes a display apparatus 2011 representing working characteristics of the battery pack. The display apparatus 2011 is disposed in a direction opposite to the insertion direction of the battery pack 201. The display apparatus 2011 includes a control panel (not shown in the figure), a battery indicator light 2012 electrically connected to the control panel, and a battery indicator button 2013. The battery indicator button 2013 is operably triggered to turn on the battery indicator light 2012. In this implementation, the attachment direction of the battery pack 201 is disposed from top to bottom, so that the operator can know the battery status of the battery packs without turning over the machine during operation.

In the following embodiments, at least one of the foregoing four factors is considered in a design of the joint positions of the two battery packs, and main differences between the design and the second implementation lie in a specific position relationship between the battery pack mounting portions 151 and 152 and the main body portion 10 and an assembling direction of the battery pack 200.

Figure 11:
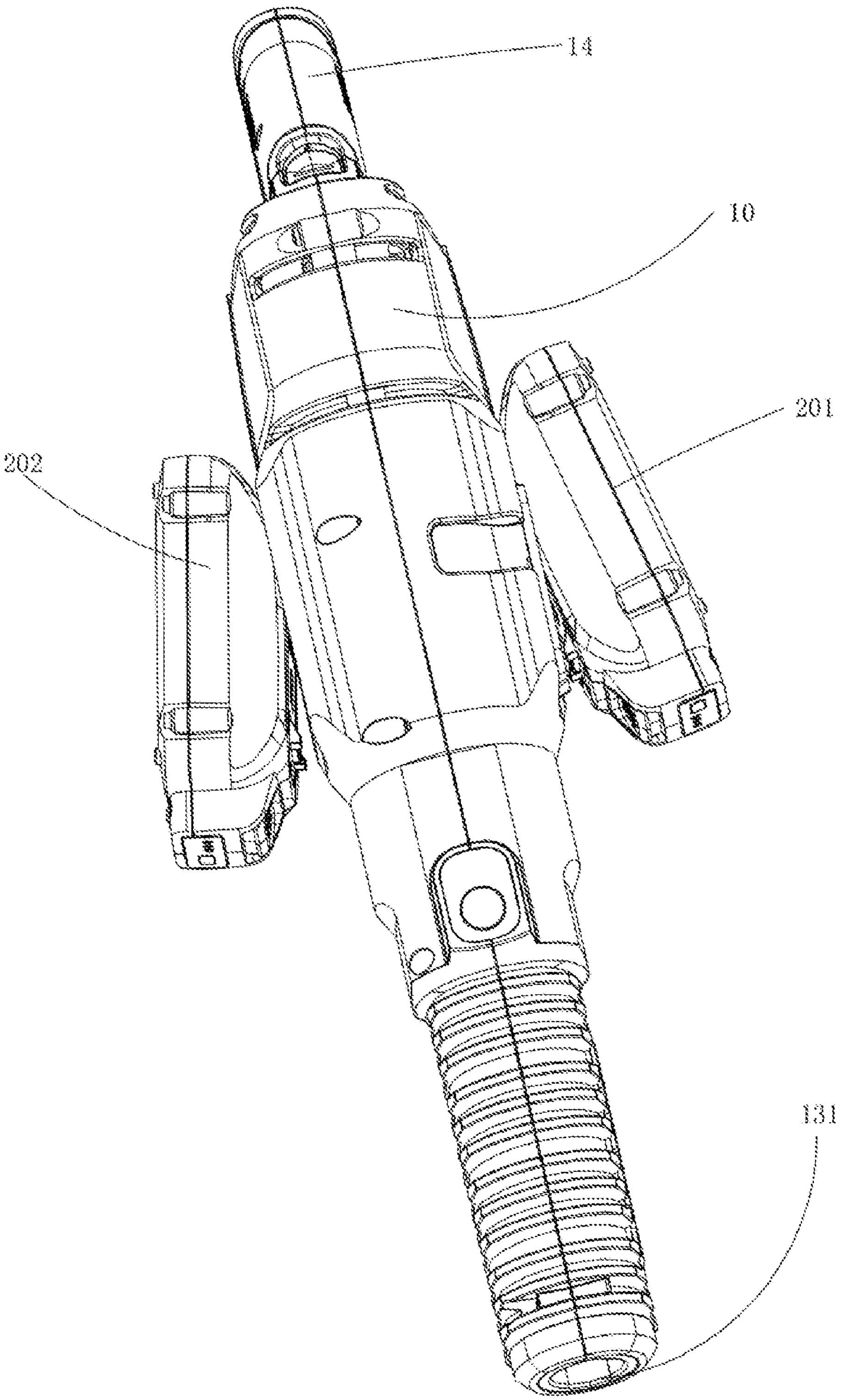
FIG. 11 is a three-dimensional schematic diagram of a third implementation of joining a battery pack to the handheld high-pressure cleaning machine.
Figure 12:
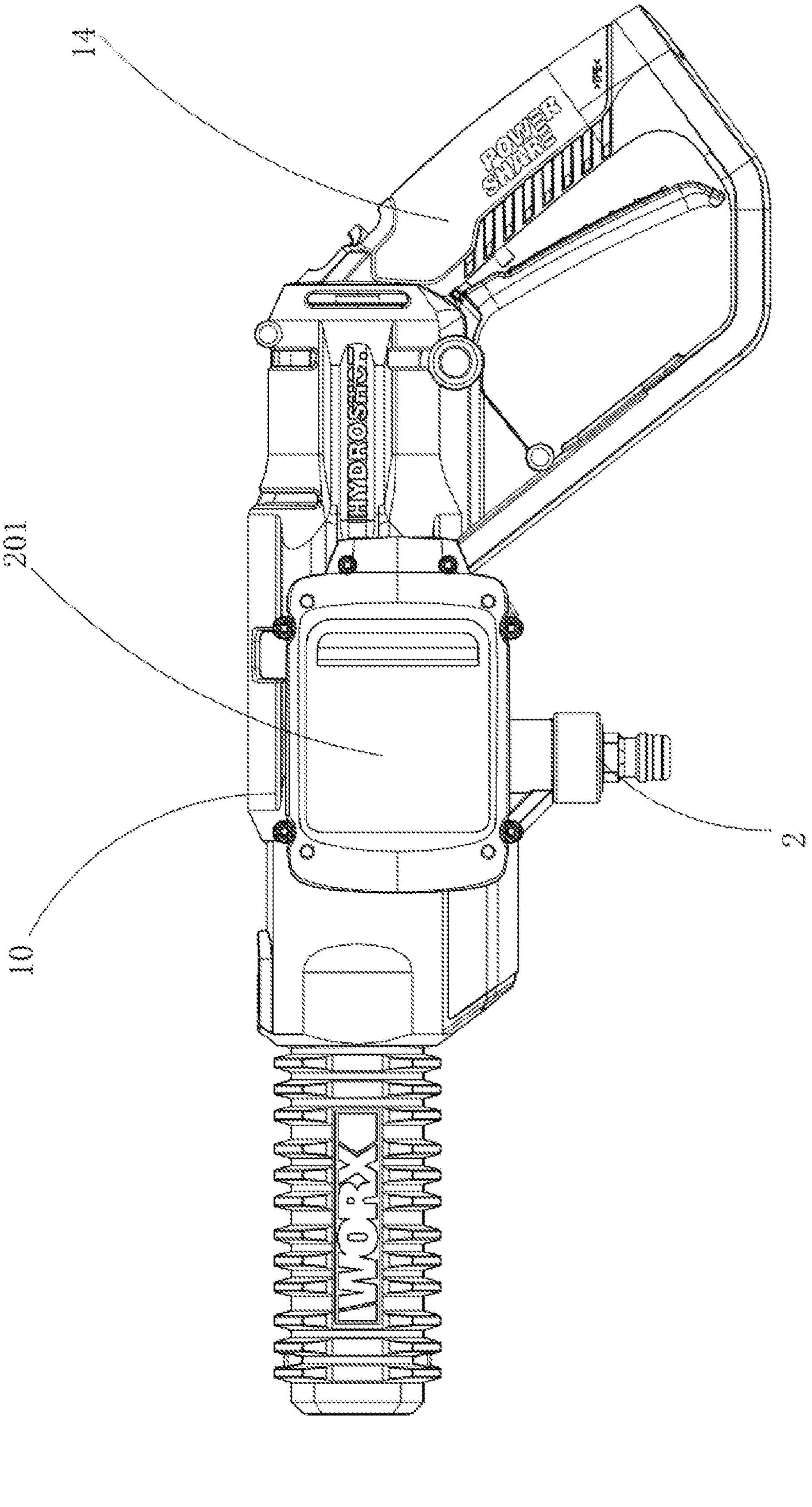
FIG. 12 is a three-dimensional schematic diagram of changing a joining angle in the implementation of joining a battery pack to the handheld high-pressure cleaning machine shown in FIG. 11.
Figure 13:
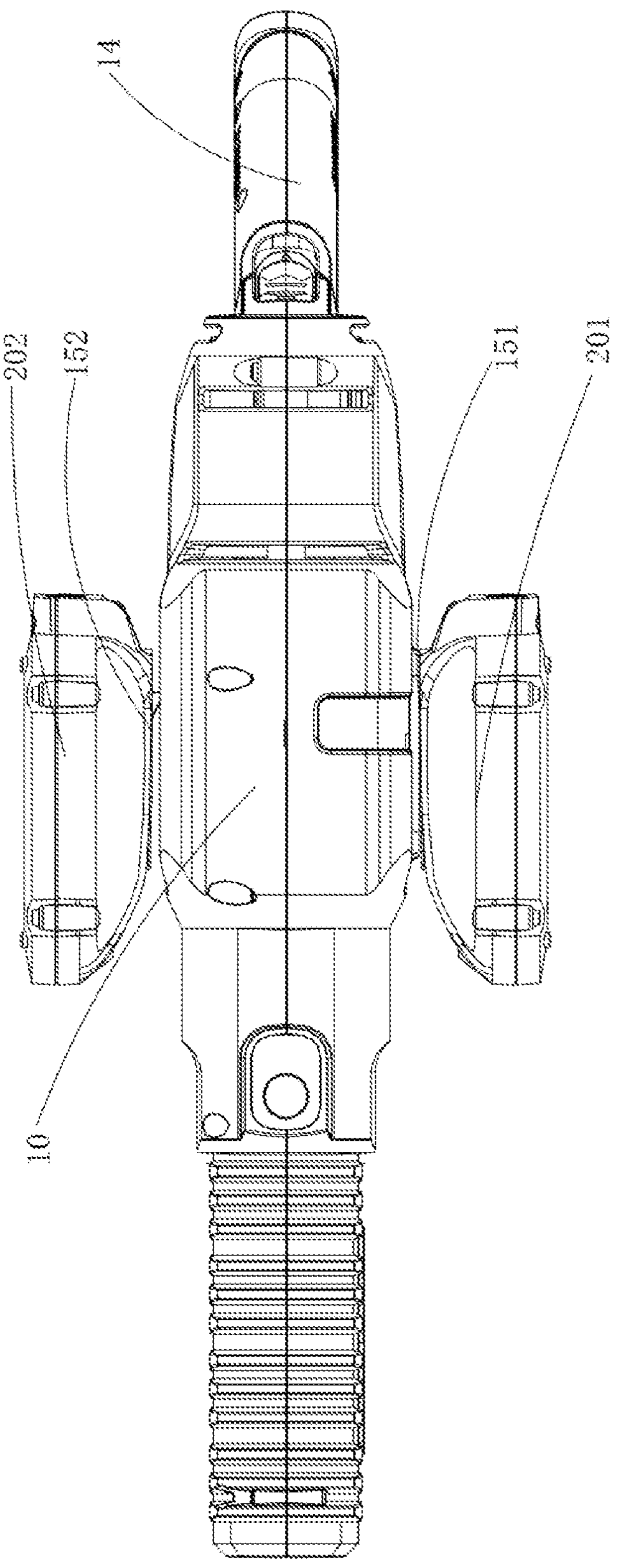
FIG. 13 is a top view after the handheld high-pressure cleaning machine is joined to the battery pack shown in FIG. 12.

Specifically, FIG. 11 to FIG. 13 are a third implementation of the design of the joint positions of the two battery packs 200 in the present invention. In this implementation, the two battery pack mounting portions 151 and 152 disposed on the main machine housing 1 are at least partially configured on the main body portion 10. Further, the two battery pack mounting portions 151 and 152 are both disposed on the pump housing 103. In other words, in this implementation, the distance between the two battery pack mounting portions 151 and 152 is greater than the width of the main body portion 10 in the transverse direction. According to such a design, the width of the entire machine in the transverse direction is increased relatively. However, the two battery mounting portions 151 and 152 are configured to be disposed around the pump housing 103. In an operation process of sucking cold water of the handheld high-pressure cleaning machine 100, cold water flowing through the pump 4 may deliver cold air to the battery packs 200 attached to the battery pack mounting portions, to cool the battery pack 200 during use.

A difference between this implementation and the previous implementation lies in that the attachment directions of the battery packs 200 are different. Specifically, as shown in FIG. 11 to FIG. 13, the attachment direction of the battery packs 201 and 202 is consistent with an extending direction of the central axis X1 of the main body portion 10. Alternatively, it may be expressed that the attachment direction of the battery packs 201 and 202 is consistent with an extending direction of a motor shaft (not marked). In addition, to make it convenient for the operator to carry the machine or hold the machine with one hand and assemble the battery packs 200 with the other hand, preferably, the attachment direction of the battery packs 200 is opposite to a liquid outlet direction. That is, the attachment direction of the battery packs 200 is that the battery packs are inserted from front to rear.

Further, FIG. 11 is only a simple variant embodiment of the position relationship between the attachment direction of the battery packs 200 and the middle plane S of the main body portion 10. Specifically, in FIG. 11, the attachment direction of the battery packs 200 is disposed obliquely relative to the middle plane S, and in FIG. 12 and FIG. 13, the attachment direction of the battery packs 200 is disposed in parallel to the middle plane S.

In the following embodiments, at least one of the foregoing four factors is considered in a design of the joint positions of the two battery packs 200, and main differences between the design and the first implementation, the second implementation, and the third implementation lie in the specific positions of the battery pack mounting portions 151 and 152 and an assembling direction of the battery packs 201 and 202.

Figure 14:
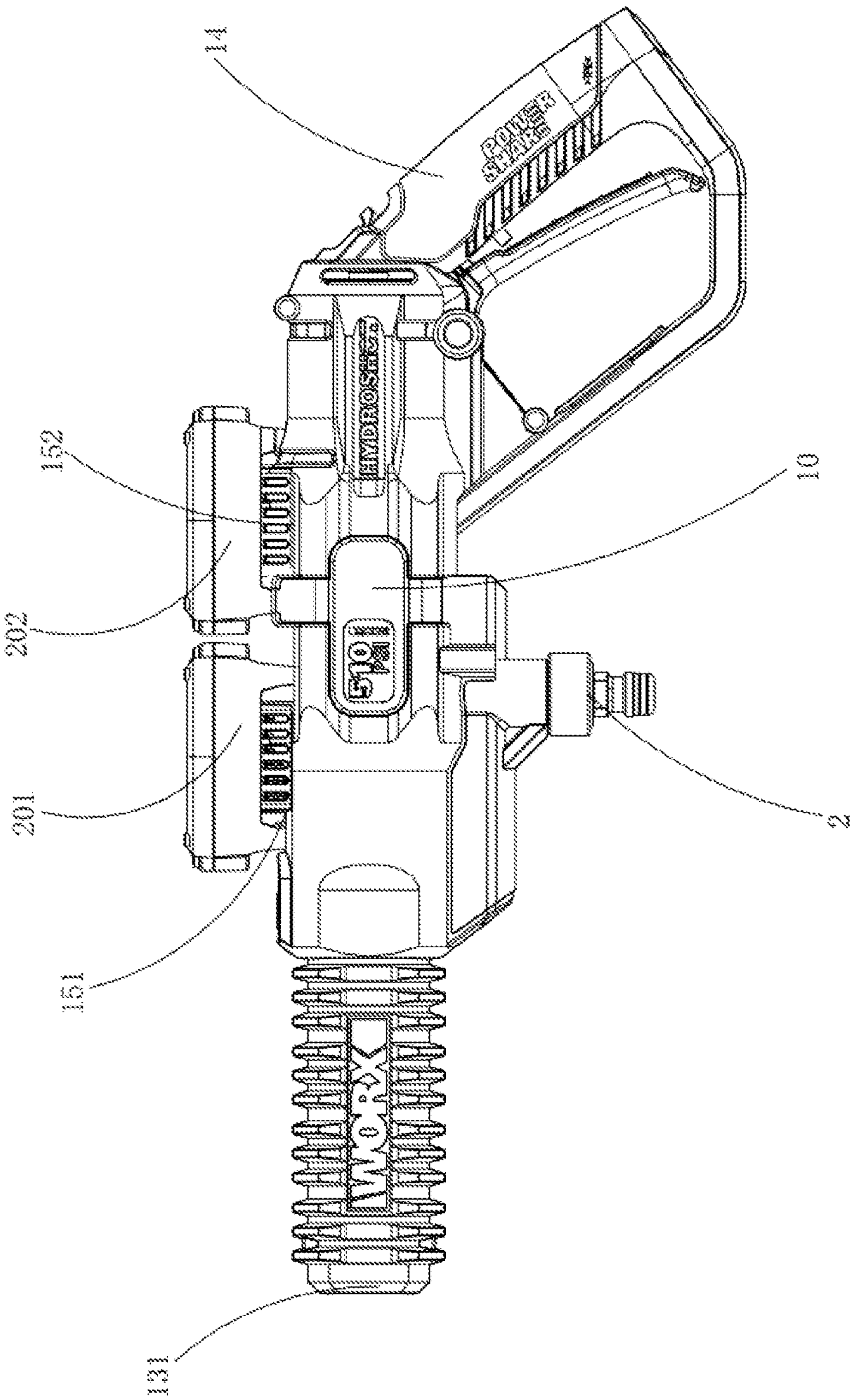
FIG. 14 is a three-dimensional schematic diagram of a fourth implementation of joining a battery pack to the handheld high-pressure cleaning machine.
Figure 15:
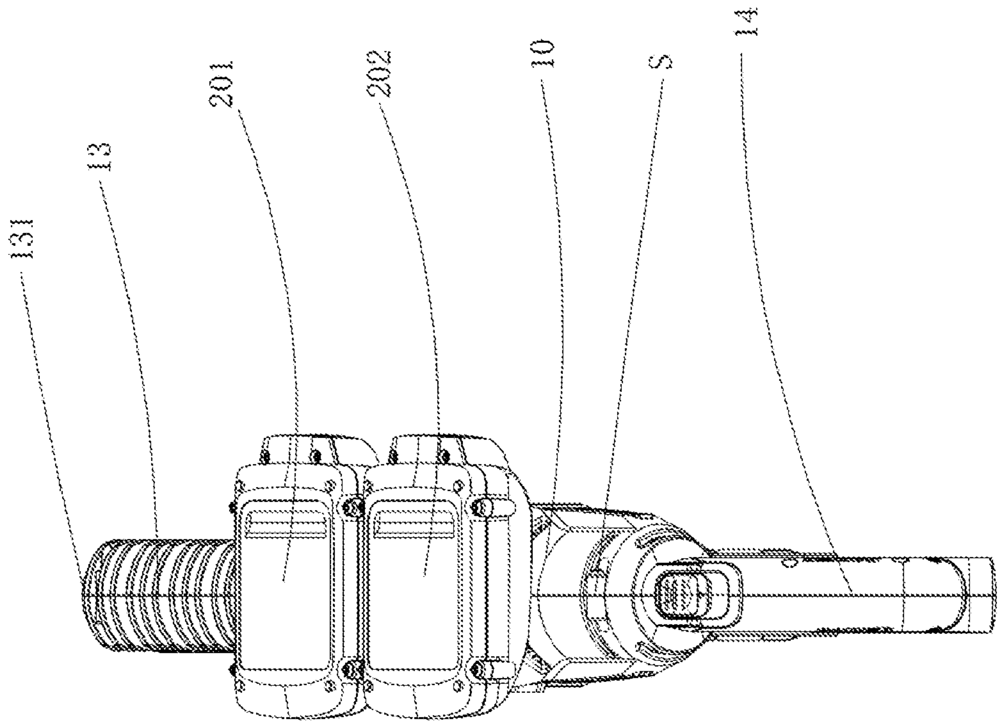
FIG. 15 is a three-dimensional schematic diagram of another angle after the handheld high-pressure cleaning machine is joined to the battery pack shown in FIG. 14.

Specifically, FIG. 14 and FIG. 15 show a fourth implementation of the joint positions of the two battery packs 201 and 202. The two battery pack mounting portions 151 and 152 both extend across the middle plane S in the transverse direction, and the two mounting portions 151 and 152 are configured to be arranged in a row in the longitudinal direction, to enable one battery pack mounting portion 151 of the two battery pack mounting portions is constructed closer to the liquid outlet 131 than the other mounting portion 152. Further, the two battery pack mounting portions 151 and 152 disposed on the main machine housing 1 are at least partially configured on the main body portion 10. The two battery pack mounting portions 151 and 152 and the liquid inlet joint 2 are relatively disposed on the upper and lower sides of the main body portion 10. Specifically, the two battery pack mounting portions 151 and 152 are both configured on the upper side of the main body portion 10. Furthermore, the attachment directions of the two battery packs 200 are the same, and the two battery packs are connected to the corresponding battery pack mounting portions in a manner of being perpendicular to the extending direction (or the middle plane S) of the motor shaft. Preferably, for the battery packs 200, the battery packs 200 are joined to the corresponding battery pack mounting portions 151 and 152 in an attachment direction from right to left.

According to such a design, on one hand, the battery pack mounting portions 151 and 152 and the liquid inlet joint 2 are disposed on the upper and lower sides, to enable the battery packs 200 to be far away from the water source, thereby improving a waterproof effect of the battery packs 200. On the other hand, the two battery packs 200 are inserted and removed in the same direction, to facilitate user operations.

In the foregoing four implementations, although there is a difference between the specific mounting positions of the two battery packs 200, there is at least one common point between the four implementations: the two battery pack mounting portions are both located between the first handle 14 and the second handle 6, thereby ensuring that the two battery packs (the first battery pack 201 and the second battery pack 202) are configured between the first handle 14 and the second handle 6 in a manner that the ratio K of the distance D between the center of gravity G of the handheld high-pressure cleaning machine and the center of the first handle 14 to the distance L between the center of the first handle 14 and the center of the second handle 6 is within a range greater than or equal to 35% and less than or equal to 50% in the longitudinal direction (or as observed from the left side).

The difference between the positions of the two battery pack mounting portions in the following embodiments and that in the foregoing implementations is relatively great. The difference mainly lies in that at least one of the battery pack mounting portions is not disposed between the first handle 14 and the second handle 6, and detailed description is given below.

Figure 21:
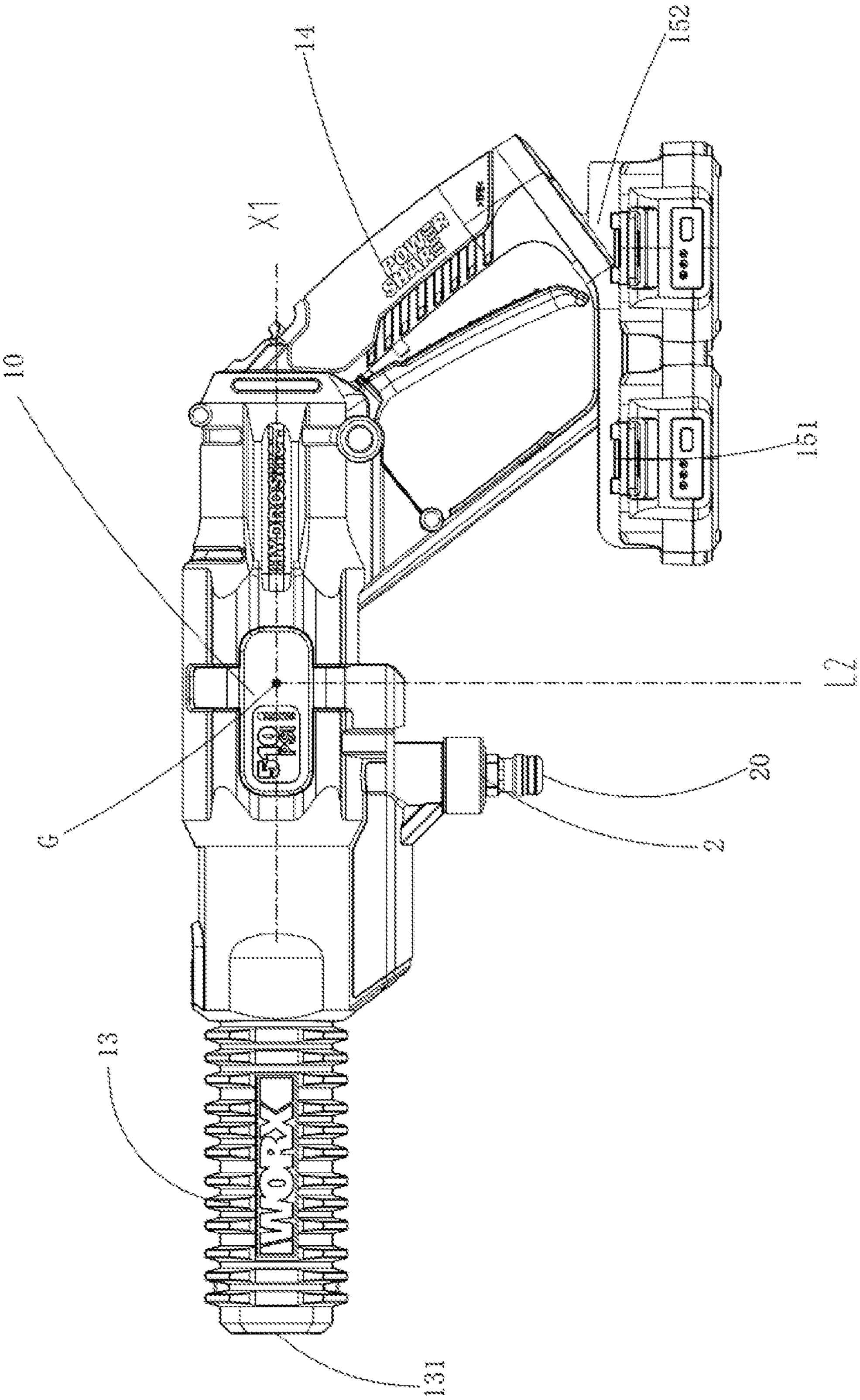
FIG. 21 is a three-dimensional schematic diagram of a sixth implementation of joining a battery pack to the handheld high-pressure cleaning machine.
Figure 22:
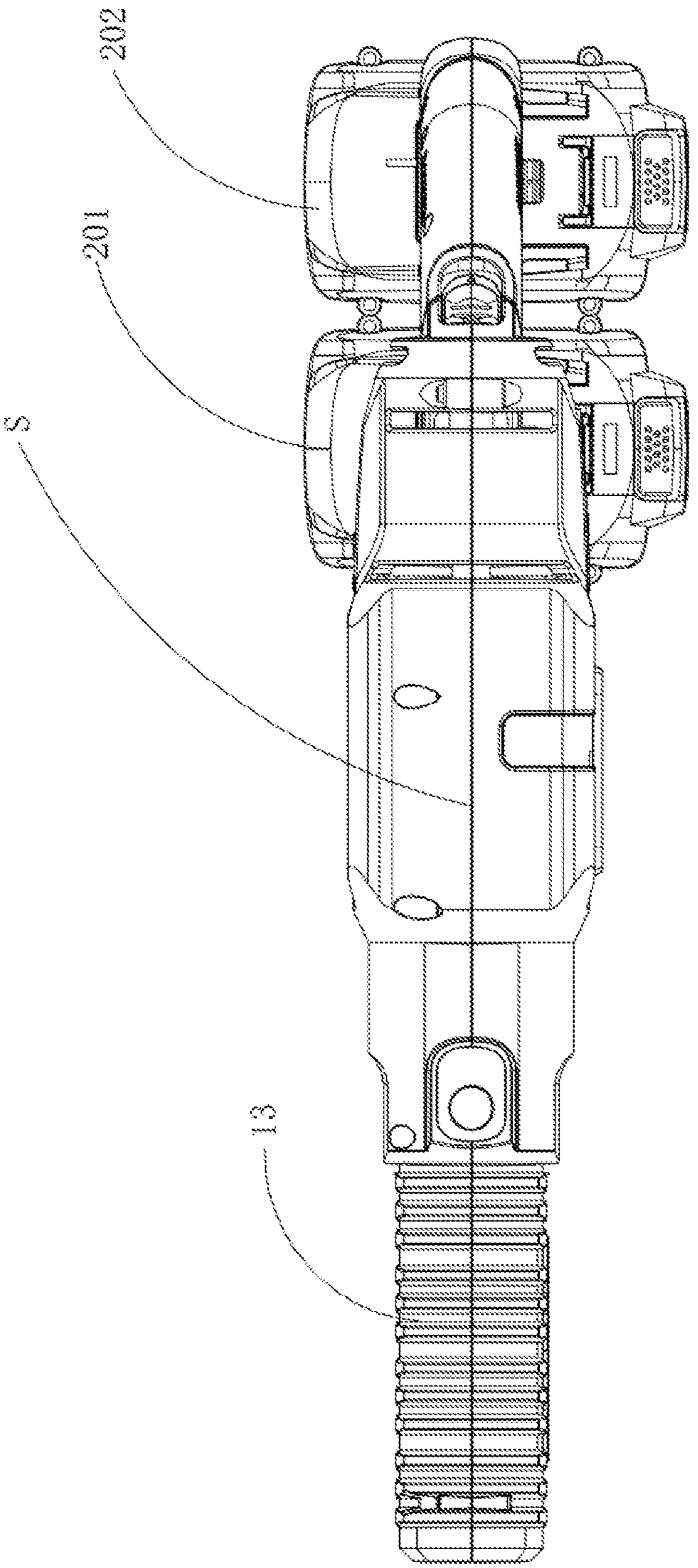
FIG. 22 is a top view after the handheld high-pressure cleaning machine is joined to the battery pack shown in FIG. 21.

FIG. 21 and FIG. 22 are a fifth implementation of the design of the joint positions of the two battery packs. The positions of the two battery pack mounting portions 151 and 152 are configured to enable the lower surfaces of the two battery packs 201 and 202 to be located on the same plane when the two battery packs 201 and 202 are mounted on the corresponding battery pack mounting portions 151 and 152. In other words, the lower surfaces of the two battery packs 201 and 202 are coplanar.

Specifically, as shown in FIG. 21, the liquid outlet joint 2 and the two battery pack mounting portions 151 and 152 are all located on the same side of the central axis X1 of the main body portion 10, the two battery pack mounting portions 151 and 152 both extend across the middle plane S in the transverse direction, and the two mounting portions 151 and 152 are configured to be arranged in a row in the longitudinal direction, to enable one of the two battery pack mounting portions 151 and 152 to be constructed closer to the liquid outlet 131 than the other. A distance between the lowermost end of the liquid inlet 20 and the central axis X1 of the main body portion 10 is less than a distance between the lower surface of the battery pack 200 and the central axis X1 of the main body portion 10. A distance between the free end of the first handle 14 and the central axis X1 of the main body portion 10 is less than a distance between a battery pack mounting surface and the central axis X1 of the main body portion 10. That is, the battery pack mounting portions 151 and 152 are disposed at a farthest end below the main body portion 10.

Furthermore, a foremost end of the at least one battery pack mounting portion 151 extends forward beyond the plumb line L2 at which the center of gravity G of the handheld high-pressure cleaning machine is located. According to such a design, when the two battery packs 201 and 202 are respectively mounted on the battery pack mounting portions 151 and 152, the two coplanar battery packs 201 and 202 can support the handheld high-pressure cleaning machine 100 to be in a standing state.

In addition, the attachment directions of the two battery packs 200 are the same, and the two battery packs are connected to the corresponding battery pack mounting portions 151 and 152 in a manner of being perpendicular to the extending direction (or the middle plane S) of the motor shaft. Preferably, for the battery packs 200, the battery packs 200 are joined to the corresponding battery pack mounting portions 151 and 152 in an attachment direction from right to left.

Figure 23:
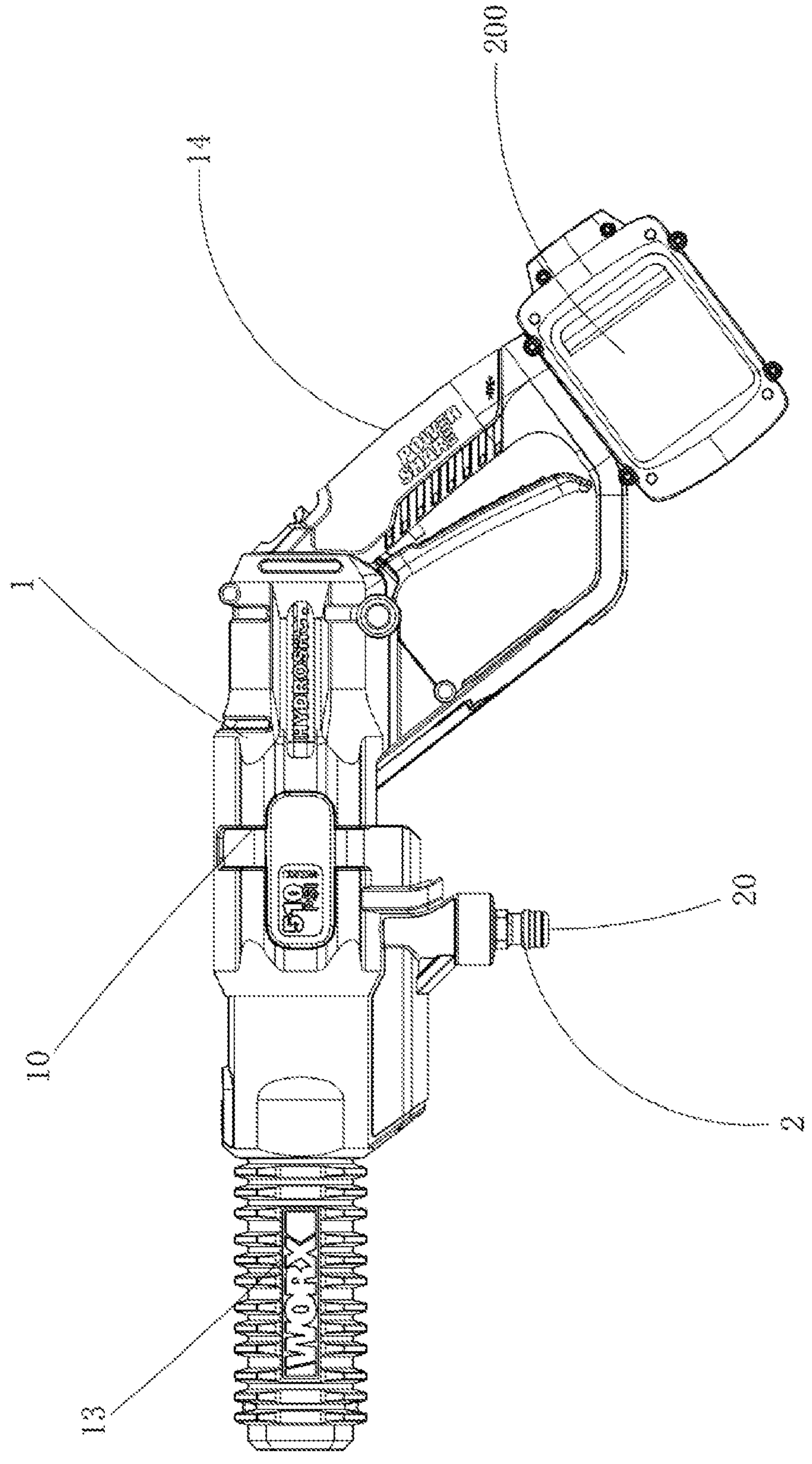
FIG. 23 is a three-dimensional schematic diagram of a seventh implementation of joining a battery pack to the handheld high-pressure cleaning machine.
Figure 24:
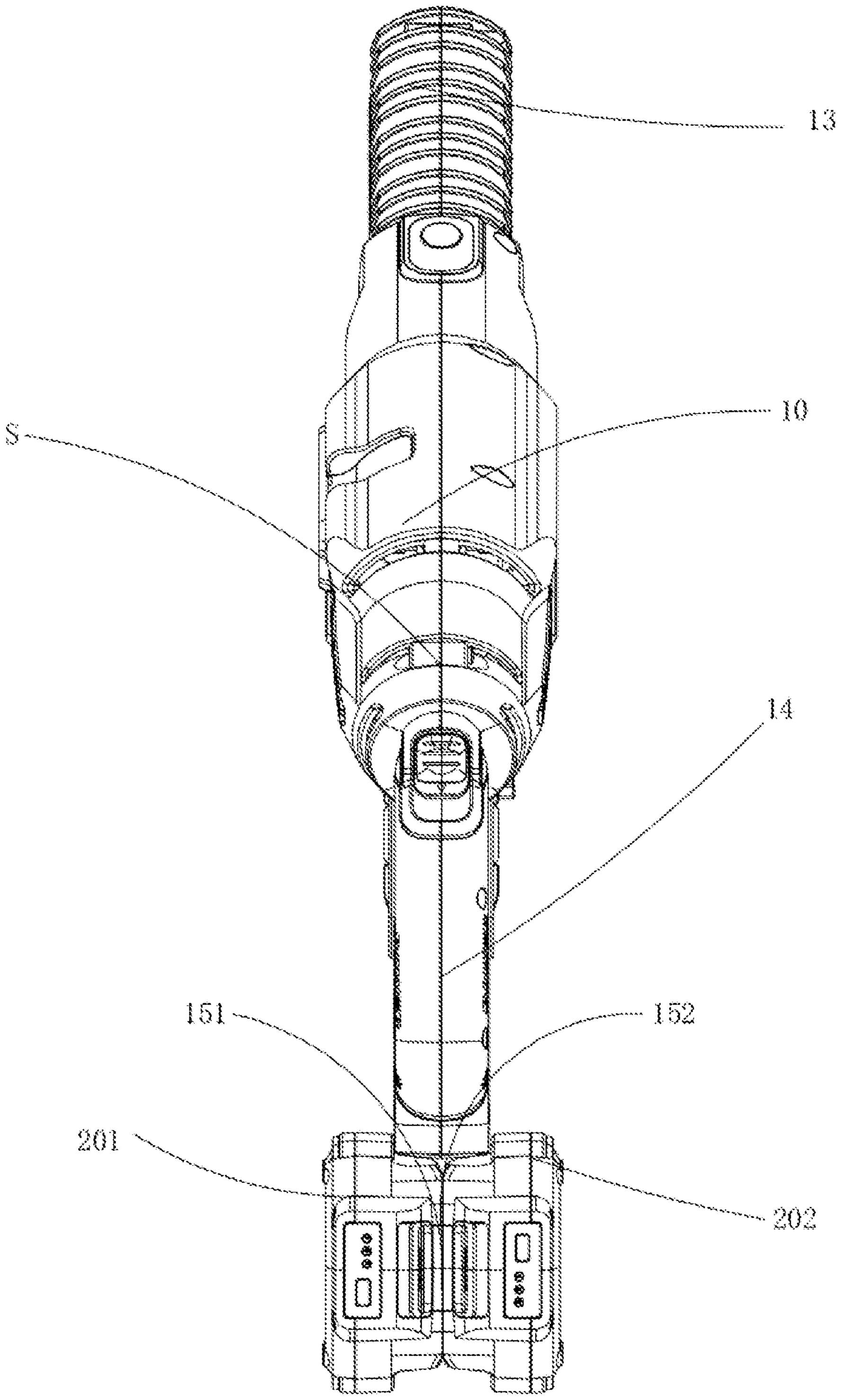
FIG. 24 is a top view after the handheld high-pressure cleaning machine is joined to the battery pack shown in FIG. 23.

FIG. 23 and FIG. 24 are a sixth implementation of the design of the joint positions of the two battery packs 200. The positions of the two battery pack mounting portions 151 and 152 are configured to enable a weight difference between the functional components (the motor 3, the pump 4, the reduction mechanism, and the battery packs 200) located on the front and rear sides of the first handle 14 is not greater than 20% when the two battery packs 201 and 202 are mounted on the corresponding battery pack mounting portions 151 and 152.

Specifically, the two battery pack mounting portions 151 and 152 are located at one end, away from the main body portion 10, of the first handle 14. The two battery pack mounting portions 151 and 152 are disposed on the left and right sides of the middle plane S in a manner of facing away from each other, and are symmetrical with each other about the middle plane S. Specifically, the two battery pack mounting portions 151 and 152 are configured in parallel on the left and right sides of the main machine housing 1 in the transverse direction. In addition, insertion directions of the battery packs 201 and 202 may be the same. According to such a design, the machine is relatively balanced in the transverse direction to ensure the reliability of operations, and the two battery packs 201 and 202 may be mounted and removed in the same direction at one time, to facilitate a disassembly operation of the user.

In the present invention, the handheld high-pressure cleaning machine 100 further includes an accessory attachment portion (not marked) integrally formed or mounted on the liquid outlet 131. The accessory attachment portion is operably connected to a spray rod, and the cleaning liquid flowing to the handheld high-pressure cleaning machine 100 can be sprayed outward from the spray rod. The spray rod includes a long-gun spray rod 300 or a short-gun spray rod 400 selectively detachably connected to the accessory attachment portion. Specifically, as shown in FIG. 16, when the handheld high-pressure cleaning machine 100 is connected to the long gun 300, the handheld high-pressure cleaning machine 100 is in a first working mode. As shown in FIG. 17, when the handheld high-pressure cleaning machine 100 is connected to the short gun 400, the handheld high-pressure cleaning machine 100 is in a second working mode. Specifically, water outlet pressure corresponding to a high-speed gear when the handheld high-pressure cleaning machine 100 is in the first working mode is different from water outlet pressure corresponding to a high-speed gear when the handheld high-pressure cleaning machine 100 is in the second working mode. Water outlet pressure corresponding to a low-speed gear when the handheld high-pressure cleaning machine 100 is in the first working mode is different from water outlet pressure corresponding to a low-speed gear when the handheld high-pressure cleaning machine 100 is in the second working mode. The user may select a corresponding gun barrel for adaptation according to a corresponding working condition requirement.

The foregoing embodiments only show some implementations of the present invention, although the descriptions are relatively specific and detailed, the implementations should not be understood as a limitation to the patent scope of the present invention. It should be noted that, persons of ordinary skill in the art may further make some variations and improvements without departing from the concept of the present invention, and the variations and improvements belong to the protection scope of the present invention.

What is claimed is:

1. A handheld high-pressure cleaning machine, comprising:

a main machine housing, mounted or integrally formed with a battery pack mounting portion, to allow detachable attachment of a battery pack, wherein the main machine housing comprises a first half housing and a second half housing located on two sides of a middle plane;

a liquid outlet, provided in the main machine housing, and configured to discharge a cleaning liquid;

a first handle, comprising a holding portion to be held by an operator, wherein the first handle is mounted or integrally formed on the main machine housing;

a motor, configured to supply a driving force for the handheld high-pressure cleaning machine to operate; and a pump, driven by the motor to output the cleaning liquid, wherein the battery pack mounting portion comprises a first battery pack mounting portion and a second battery pack mounting portion, and the battery pack comprises a first battery pack connected to the first battery pack mounting portion and a second battery pack connected to the second battery pack mounting portion; and as observed from a rear side of the handheld high-pressure cleaning machine, the first battery pack and the second battery pack are attached to the main machine housing in a manner that a center of gravity G of the handheld high-pressure cleaning machine is within a range of 1 to 1.5 times a width of the holding portion on a left or right side of the middle plane.

2. The handheld high-pressure cleaning machine according to claim 1, wherein the main machine housing comprises a main body portion, the liquid outlet is located at a first end of the main body portion, the first handle is disposed at a second end of the main body portion, the main body portion and the first handle cooperate with each other to form a mounting space, and the first battery pack mounting portion and the second battery pack mounting portion are both located in the mounting space.

3. The handheld high-pressure cleaning machine according to claim 1, wherein the first battery pack mounting portion and the second battery pack mounting portion are symmetrical about the middle plane.

4. The handheld high-pressure cleaning machine according to claim 1, wherein the first battery pack and the second battery pack are specifically a group of battery packs with a same specification, and the group of battery packs is capable of being used together to supply power to the motor.

5. The handheld high-pressure cleaning machine according to claim 1, wherein the main machine housing approximately has a pistol shape, and the motor and the pump are both located in the main machine housing.

6. The handheld high-pressure cleaning machine according to claim 1, wherein:

the main machine housing further comprises a main body portion, the main body portion is provided with the middle plane, and the main body portion is disposed approximately symmetrical about the middle plane; and the first battery pack mounting portion and the second battery pack mounting portion are respectively disposed on left and right sides of the middle plane in a manner that a distance W2 between a leftmost edge of the first battery pack mounting portion and a rightmost edge of the second battery pack mounting portion in a transverse direction is not greater than a width W1 of the main body portion in the transverse direction.

7. The handheld high-pressure cleaning machine according to claim 6, wherein the first battery pack and the second battery pack slide from bottom to top to be attached to corresponding battery pack mounting portions.

8. The handheld high-pressure cleaning machine according to claim 6, wherein:

each of the first battery pack mounting portion and the second battery pack mounting portion is provided with two parallel mounting guide rails, and the first battery pack and the second battery pack slide along mounting guide rails to be respectively attached to the first battery pack mounting portion and the second battery pack mounting portion; and an extending direction of each mounting guide rail is approximately parallel to the extending direction of the holding portion of the first handle.

9. The handheld high-pressure cleaning machine according to claim 1, wherein:

the first handle is disposed at an end away from the liquid outlet;

the handheld high-pressure cleaning machine further comprises a second handle, and the second handle cooperates with the first handle to implement two-hand operation of the handheld high-pressure cleaning machine; and the first battery pack and the second battery pack are configured between the first handle and the second handle in a manner that a ratio K of a distance D between the center of gravity G of the handheld high-pressure cleaning machine and a center of the first handle to a distance L between the center of the first handle and the center of the second handle is within a range of greater than or equal to 35% and less than 50% in a longitudinal direction.

10. The handheld high-pressure cleaning machine according to claim 9, wherein the motor and the pump are both located in the main machine housing, and the motor, the pump, the first battery pack, and the second battery pack are distributed in a manner that at least one structure of the motor, the pump, the first battery pack, and the second battery pack is configured on a rear side of the center of gravity G of the handheld high-pressure cleaning machine in the longitudinal direction.

11. The handheld high-pressure cleaning machine according to claim 9, wherein:

the main machine housing further comprises a main body portion;

the handheld high-pressure cleaning machine comprises a liquid inlet joint provided with a liquid inlet, the liquid inlet is in fluid communication with the pump; and the first battery pack mounting portion and the second battery pack mounting portion are disposed between the liquid inlet joint and the first handle and located below the main body portion.

12. The handheld high-pressure cleaning machine according to claim 9, wherein in the longitudinal direction, a combined center of gravity G0 of the first battery pack and the second battery pack is located on a rear side of the center of gravity G of the handheld high-pressure cleaning machine.

13. The handheld high-pressure cleaning machine according to claim 9, wherein the second handle is disposed closer to the liquid outlet than the first handle, and in the longitudinal direction, a value range of the distance L between the center of the first handle and the center of the second handle is 200 mm≤L≤400 mm.

14. The handheld high-pressure cleaning machine according to claim 1, wherein:

the liquid outlet is formed at a free end of the main machine housing;

the first handle is disposed at an end away from the liquid outlet;

the handheld high-pressure cleaning machine is capable of being supported on a support plane by a liquid outlet portion and the first battery pack and the second battery pack, a part of the liquid outlet portion which is in contact with the support plane, is defined as a first support point U; a part of the first battery pack which is in contact with the support plane, is defined as a second support point V; a part of the second battery pack which is in contact with the support plane, is defined as a third support point W;

the first support point U, the second support point V, and the third support point W are connected end to end to form a triangle, and the triangle comprises a perpendicular line drawn through the first support point U to an opposite side of first support point U; and in a transverse direction, a projection G' of the center of gravity G of the handheld high-pressure cleaning machine on a plane Z formed by the triangle is located on the perpendicular line, or the first battery pack and the second battery pack are mounted on corresponding battery pack mounting portions in a manner that a size range in which the projection G' deviates leftward or rightward from the perpendicular line is not greater than a half of a size of a line segment V-W formed by connecting the second support point V and the third support point W.

15. The handheld high-pressure cleaning machine according to claim 14, wherein the projection G' of the center of gravity G of the handheld high-pressure cleaning machine on the plane Z is located in a region formed by the triangle.

16. The handheld high-pressure cleaning machine according to claim 14, wherein:

the main machine housing comprises a main body portion, the motor and the pump are both located in the main body portion, the liquid outlet portion is disposed on a side of the main body portion that is away from the first handle, and the liquid outlet portion comprises a liquid outlet pipe that is in fluid communication with the pump and a second handle that is at least partially disposed on a periphery of the liquid outlet pipe; and the second handle and the first handle cooperate with each other to implement two-hand operation of the handheld high-pressure cleaning machine.

17. The handheld high-pressure cleaning machine according to claim 14, wherein the handheld high-pressure cleaning machine further comprises an accessory attachment portion integrally formed or mounted on the liquid outlet and a spray rod connected to the accessory attachment portion, and cleaning liquid is capable of being sprayed outward from the spray rod.

* * * * *